US008813024B2

(12) United States Patent
Akkiraju et al.

(10) Patent No.: US 8,813,024 B2
(45) Date of Patent: Aug. 19, 2014

(54) SYSTEM AND A METHOD FOR CROSS-PLATFORM PORTING OF BUSINESS APPLICATION AND MAKING THEM CONTEXTUALLY-AWARE ON TARGET PLATFORMS

(75) Inventors: Rama Kalyani T. Akkiraju, San Jose, CA (US); Manisha Dattatraya Bhandar, Yorktown Heights, NY (US); Pankaj Dhoolia, Uttar Pradesh (IN); Nilay Ghosh, West Bengal (IN); Tilak Mitra, Coconut Creek, FL (US); Rakesh Mohan, Cortlandt Manor, NY (US); Dipankar Saha, West Bengal (IN); Wei Zhao, Bejing (CN)

(73) Assignee: International Business Machines Corporation, Armonk, NY (US)

( * ) Notice: Subject to any disclaimer, the term of this patent is extended or adjusted under 35 U.S.C. 154(b) by 1237 days.

(21) Appl. No.: 12/235,214

(22) Filed: Sep. 22, 2008

(65) Prior Publication Data
US 2010/0077386 A1    Mar. 25, 2010

(51) Int. Cl.
*G06F 9/44* (2006.01)
(52) U.S. Cl.
CPC ...................................... *G06F 8/35* (2013.01)
USPC ........................................................ 717/104
(58) Field of Classification Search
CPC ....................................................... G06F 8/35
USPC ........................................................... 717/104
See application file for complete search history.

(56) References Cited

U.S. PATENT DOCUMENTS

| | | | |
|---|---|---|---|
| 8,027,948 B2 | 9/2011 | Akkiraju et al. | |
| 8,127,270 B1 | 2/2012 | Jerman et al. | |
| 8,141,069 B2 | 3/2012 | Koehler | |
| 2002/0147606 A1 | 10/2002 | Hoffmann et al. | |
| 2004/0249645 A1 | 12/2004 | Hauser et al. | |
| 2005/0080609 A1 | 4/2005 | Bhaskaran et al. | |
| 2005/0080640 A1 | 4/2005 | Bhaskaran et al. | |
| 2006/0064667 A1 | 3/2006 | Freitas | |
| 2006/0106626 A1* | 5/2006 | Jeng et al. .................. 705/1 |
| 2006/0130008 A1 | 6/2006 | Nguyen et al. | |
| 2006/0130009 A1 | 6/2006 | Cornell et al. | |
| 2006/0130011 A1 | 6/2006 | Cornell et al. | |
| 2006/0242195 A1 | 10/2006 | Bove et al. | |
| 2007/0118551 A1 | 5/2007 | Akkiraju et al. | |
| 2007/0226681 A1 | 9/2007 | Thorup | |
| 2007/0288222 A1 | 12/2007 | Eilam et al. | |
| 2007/0288286 A1 | 12/2007 | Linehan | |

(Continued)

OTHER PUBLICATIONS

Jon Siegel, "Using OMG's Model Driven Architecture (MDA) to Integrate Web Services", 2002, pp. 1-9.*

(Continued)

*Primary Examiner* — Wei Zhen
*Assistant Examiner* — Lanny Ung
(74) *Attorney, Agent, or Firm* — Cantor Colburn LLP; William Stock

(57) ABSTRACT

A method for cross-platform porting of applications includes extracting one or more platform independent models from an existing one or more composite applications running on a given source platform. These platform independent models are then transformed into implementation artifacts on another, target platform, thereby effectively porting the composite application from one platform to another. The generated implementation artifacts on the target platform leverage existing assets in the target environment, which makes these generated artifacts "contextually-aware".

19 Claims, 33 Drawing Sheets

Model-2-Code Transformation    Model-2-Model Transformation

(56) References Cited

U.S. PATENT DOCUMENTS

| | | |
|---|---|---|
| 2008/0229276 A1 | 9/2008 | Koehler et al. |
| 2008/0276229 A1 | 11/2008 | Hawkins et al. |
| 2009/0150854 A1* | 6/2009 | Elaasar et al. ............... 717/104 |
| 2009/0150860 A1 | 6/2009 | Gschwind et al. |
| 2009/0319981 A1 | 12/2009 | Akkiraju et al. |
| 2010/0077386 A1 | 3/2010 | Akkiraju et al. |
| 2011/0161922 A1 | 6/2011 | Gerken |
| 2012/0042299 A1 | 2/2012 | Perrin et al. |
| 2012/0110545 A1 | 5/2012 | Jerman et al. |

OTHER PUBLICATIONS

Wadsack et al., "Towards Model-Driven Middleware Maintenance", 2002.*

Fong, "Successful Implementation of Model Driven Architecture," Borland, The Open Alm Company, (Jun. 2007), pp. 1-16.

Kleppe et al., "MDA Explained: The Model Driven Architecture: Practice and Promise", Addison-Wesley Professional, (Apr. 21, 2003), Chapters 4-6, 8 and 10.

Akkiraju et al, Non-Final Office Action for U.S. Appl. No. 12/142,040 mailed on Aug. 18, 2011.

Javed et al., "Automated Generation of Test Case Using Model-driven Architecture," The Computer Society, (AST 07), IEEE, (Feb. 2007), pp. 1-7.

Akkiraju, Rama et al., "Searching Service Repositories by Combining Semantic and Ontological Matching", IBM Watson Research Center, 19 Skyline Drive, Hawthorne, NY, 2005, 8 pages.

Rama Akkiraju et al., Semaplan: Combining Planning with Semantic Matching to Achieve Web Service Composition, IBM Watson Research Center, 19 Skyline Drive, Hawthorne, NY, American Association for rtificial Intelligence, 2005.

Arsanjani et al., "SOMA: A method for developing service-oriented solutions", Aug. 6, 2008, IBM Systems Journal, vol. 47, No. 3, pp. 377-396 <http://www.cs.jyu.fi/el/tjtse54_98.Artikkelit/ArsanjaniEtAIIBMSsJ.pdf>.

Billig, Andreas et al., Platform Independent Model Transformation Based on Triple, H.-A. Jacobsen (Ed.): Middleware 2004, LNCS 3231, 2004, pp. 493-511.

Fong, Choong Koon "Quick Start Guide to MDA A Primer to Model-Driven Arechitecture Using Borland Together Technologies" Sep. 2006, pp. 1-80.

Hazra, Tushar K., "MDA brings standards-based modeling to EAI teams", May 1, 2002, adtmag.com, pp. 1-5 <http://adtmag.com/articles/2002/05/01/mda-brings-standardsbased-modeling-to-eai-teams.aspx>.

He et al., "Constructing Platform Independent Models of Web Application", 2005 IEEE, SOSE'05, pp. 1-5 <http://ieeexplore.ieee.org/xpls/abs_all.jsp?arnumber=1551133&tag+1>.

Liu, Chang., "Platform-Independent and Tool-Neutral Test Descriptions for Automated Software Testing" ICSE, 2000, Limerick, Ireland, pp. 713-715.

Medjahed, Brahim et al., Business-to-Business Interactions: Issues and Enabling Technologies, The VLDB Journal (2003) 12: 59-85/ Digital Object Identifier (DOI) 10.1007/s00778-003-0087-z, pp. 59-85.

Office Action—Final for U.S. Appl. No. 12/142,040, filed Jun. 19, 2008; First Named Inventor: Rama Kalyani T. Akkiraju; Mail Date: Feb. 16, 2012.

Office Action—Non-Final for U.S. Appl. No. 12/206,950, filed Sep. 9, 2008; First Named Inventor: Rama Kalyani T. Akkiraju; Mailing Date: Mar. 13, 2012.

Siegel, Jon, Ph.D Why Use the Model Driven Architecture to Design and Build Distributed Applications?, ICSE '05, May 15-221, 2005, St. Louis Missouri, USA, p. 37.

Agarwal et al, "A Service Creation Environment Based on End to End Composition of Web Services", 2005 ACM, WWW 2005, May 10-14, 2005, Chiba, Japan, pp. 128-137; <http://dl.acm.org/citation.cfm?id=1060745.1060768&coll=DL&dl=GUIDE&CFID-188423796&CFTOKEN=27139582>.

Akkiraju, et al, "Toward the Development of Cross-platform Business Applications via Model-driven Transformations", 2009 IEEE, pp. 582-592; <http://ieeexplore.ieee.org/stamp/stamp.js?tp=arnumber=5190690>.

Chabaane et al, "From Platform Independent Service Compostion Model in BPMN4SOA to Executable Service Compositions", 2010 ACM, iiWAS2010, Nov. 8-10, 2010, Paris, France, pp. 653-656; <http://dl.acm.org/citation.cfm?id-1967588>.

Koehler et al, "A Model-Driven Transformation Method", 2003 IEEE, EDOC'03, pp. 1-12; <http://ieeexplore.ieee.org/stamp/stamp.jsp?tp=&arnumber=1233848>.

Nguyen et al, "Agile Development of Platform Independent Model in Model Driven Architecture", 2010 IEEE, pp. 344-347; <http://ieeexplore.ieee.org/stamp/stamp.jsp?tp=&arnumber=5513837>.

Rozanc et al, "Producing the Platform Independent Model of an Existing Web Application", 2012 IEEE, pp. 1341-1348; <http://proceedings.fedcsis.org/2012/pliks/276.pdf>.

Telea, "Reverse Engineering—Recent Advances and Applications", 2012 In Tech, Croatia, pp. 1-290; <http://www.cs.rug.nl/~alext/PAPERS/InTech12/book.pdf>.

* cited by examiner

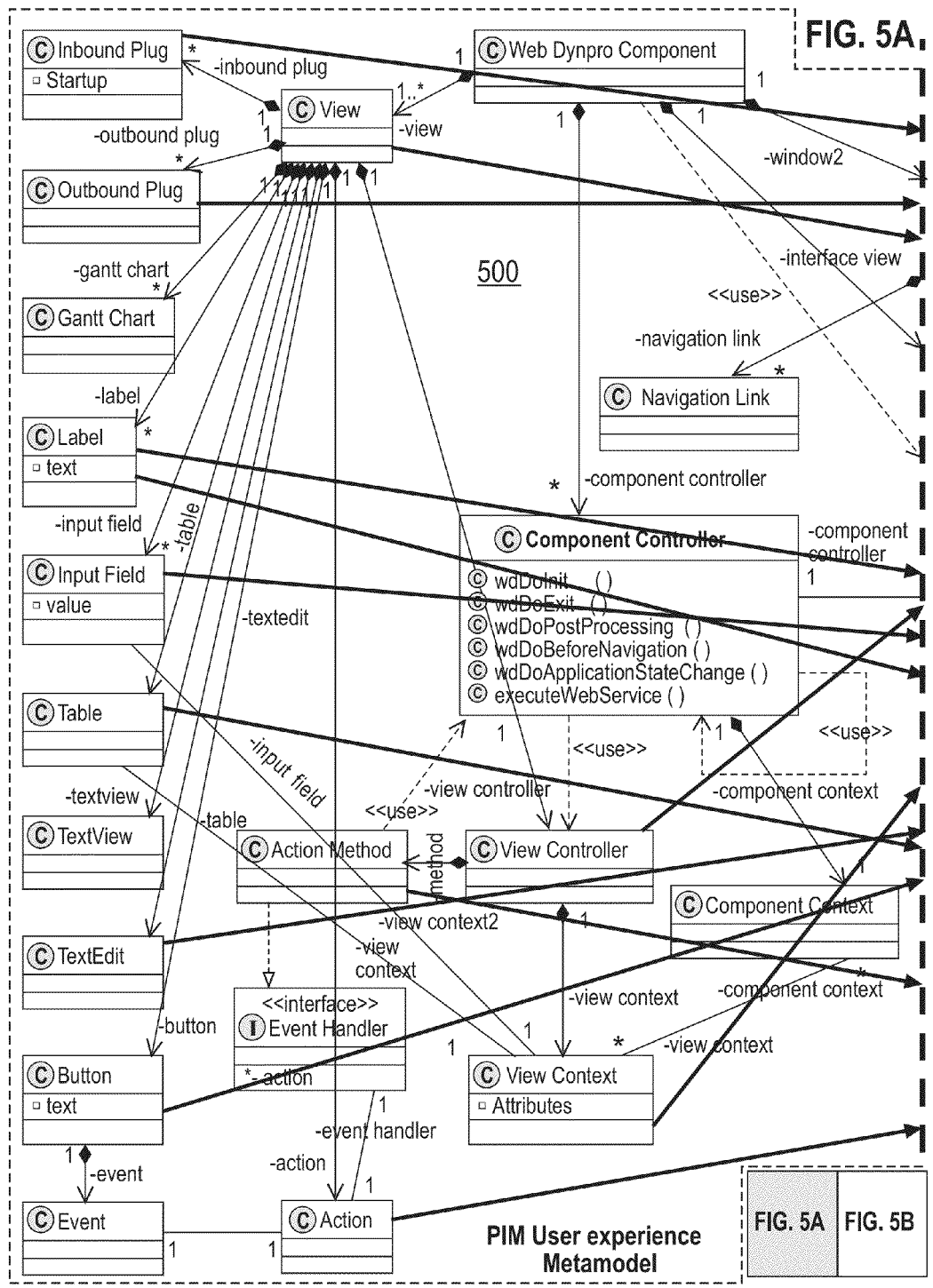

SYSTEM AND A METHOD FOR CROSS-PLATFORM PORTING OF BUSINESS APPLICATION AND MAKING THEM CONTEXTUALLY-AWARE ON TARGET PLATFORMS

FIELD OF THE INVENTION

The present invention relates generally to the implementation of business services and, more particularly, to a system and method for cross-platform porting of applications.

DESCRIPTION OF THE RELATED ART

IT services companies are increasingly focusing their efforts on building reusable solutions rather than building point solutions to individual clients which tend to be expensive and time consuming. For example, major pieces of solutions such as *Request for Quote, First Notice of Loss* for insurance industry and *Trade Promotions Management* for distribution industry are being developed ahead of time internally on choice platforms and are then being customized for specific client needs upon winning a deal. IT services companies see this as a way to deliver solutions quickly and cost effectively to their clients.

However, there are challenges to be overcome even with this reusable solution approach. One of the main challenges is that these pre-built solutions still need varying amounts of customization at each client environment. This is so because every client has a unique combination of packaged vendor solutions (e.g., SAP, Oracle) and legacy applications and would prefer specific middleware platforms (such as IBM WebSphere platform, Oracle/BEA platform, SAP NetWeaver platform, etc.). The solution has to be customized to work with the existing environment on the choice platform of the client and be integrated with its specific legacy applications. We raise two questions in this setting:

First, how can IT services companies develop solutions on one platform and have it run on multiple platforms without having to redo the same solution from scratch on each platform?

Second, how can IT services companies develop solutions on one platform and then adapt them to individual client settings with varied IT environments and platforms more effectively and efficiently than developers doing it manually?

Model driven architecture (MDA) and model driven development (MDD) approaches proposed by the Object Management Group (OMG) are proposed as solutions to address both questions in the literature. MDA postulates that a key aspect of building reusable solutions is developing reusable models. According to this approach, the functional specification of a new business solution can be described formally in a platform independent model and can be translated to a platform specific model. This platform specific model can then be translated into implementation artifacts such as code and database schema that pertain to that target platform via fully or partially automated model-driven transformations. The emphasis is on building full and complete formal models in modeling languages such as UML. Several model-driven transformations can then be applied to translate these models into implementation artifacts. MDA also talks about reverse engineering models from implementation artifacts to some extent although most commercial MDA tools tend to support forward transformations more naturally than the reverse transformations.

Much has been talked about code reuse but the promise of code reuse is often hard to realize. This is so because code that is built on one platform may or may not be easily translated into another platform. If the programming language requirements are different for each platform or if the applications to be developed involve integrating with several local legacy systems, then code reuse is difficult to achieve due to the sheer nature of heterogeneity. The nuances of each platform may make code reuse difficult even if the code is built using the same programming language (e.g., Java) using the same standards (such as J2EE) on the source platform as is expected on the target platform. There is a tacit acknowledgement among practitioners that model reuse is more practical than code reuse. Platform independent models of a given set of business solutions either developed manually or extracted through automated tools from existing solutions can provide a valuable starting point for reuse. A platform independent model (PIM) of a business application is a key asset for any client for future enhancements to their business processes because it gives the client a formal description of what exists. The PIM is also a key asset for IT consulting companies as well if the consulting company intends to develop pre-built solutions in certain industries.

In a model driven development approach, given two meta-models, i.e., a source meta-model and a target meta-model and the transformation rules that can transform the source meta-model into the target meta-model, any given platform independent model that adheres to the source meta-model can be translated into a platform specific model (PSM) that adheres to the target meta-model. The resulting PSM can then be translated into various implementation artifacts on the target platform. This is called forward engineering. By reversing this approach, platform independent models can be extracted from platform specific models and implementation artifacts.

The MDA approach has been applied to generate implementation artifacts from platform independent models in the past with varying degrees of success. Among the criticisms of the MDD approach is that it assumes that complete and formal models can be created upfront for any given application and that the meta-models of the target platforms are available. In addition, it does not say much about how the generated implementation artifacts can/should work with the existing legacy systems on a given client platform—the second question we have raised. For example, if a client already has an SAP ERP system to maintain customer accounts, regenerating implementation artifacts to create and maintain such information is not practical. When building new or changed business applications leveraging existing functionality that reflects the client's context is critical.

Some aspects of model driven development have been looked at by research efforts such as the Model-Driven Business Transformation (MDBT), which is one example of the MDD approach. MDBT efforts have been successful within the context of their scope. However, MDBT efforts have focused either only on transforming a platform independent model to platform specific artifacts without much consideration for the existing client context, or on transforming a platform independent model to a single platform.

The prior art and features in vendor tools such as the IBM Rational Software Architect (RSA) provide the method and some tooling capabilities (with several gaps) to extract models. However, most of the reverse engineering has focused on extracting the structural models (e.g., class models) from implementation artifacts. For example, if a UML model were to be derived from a piece of Java code, reverse engineering techniques have looked at deriving structural models such as classes, their data members and interfaces, etc. This approach, although it works to a degree, does not provide a high-enough level of abstraction required to maximize the reusability of the extracted platform independent model in a service-oriented architecture (SOA). For example, in a service-oriented architecture, the modular reusable abstraction is defined at the level of services rather than classes. This distinction is important because abstraction at the level of services enables one to link the business functions offered by services with business objectives—this link is important to increase the reusability of PIM models as well. The reusability of the reverse-engineered models with the current state-of-the-art is diminished by the lack of proper linkages to higher level business objectives.

BRIEF SUMMARY

In an embodiment of the invention, a method for cross-platform porting of applications includes extracting one or more platform independent models from an existing one or more composite applications running on a given source platform. These platform independent models are then transformed into implementation artifacts on another, target platform, thereby effectively porting the composite application from one platform to another. The generated implementation artifacts on the target platform leverage existing assets in the target environment, which makes these generated artifacts "contextually-aware".

In an aspect of an embodiment of the invention, a method for extracting a platform independent model from a composite application includes identifying existing implementation artifacts of the composite application; transforming the identified implementation artifacts to generate a platform specific model, wherein to generate a PSM includes one or more transformations between the implementation artifacts and one or more meta-models of the PSM; and transforming the PSM to generate a PIM, wherein to generate a PIM includes one or more transformations between the one or more meta-models of the PSM and one or more meta-models of the PIM. The generated PIM may include the structural, behavioral and user experience models of the composite application. In addition, the structural models are elevated to higher-level services to enhance the reusability of the generated PIM. Furthermore, these higher levels of abstraction enable the models to be linked with business objectives. Establishing this linkage is important for companies to understand and maintain their project portfolios. The reusable PIMs, thus generated, can then be translated into implementation artifacts, possibly on a different platform, for a different client via model-driven transformations in the forward direction. This helps cut down the development time during project implementation, thereby resulting in reduced project durations and costs.

In another aspect of an embodiment of the invention, a method for generating implementation artifacts for contextually-aware applications includes utilizing a PIM of an application; generating a PSM from the PIM, wherein the generating of a PSM includes one or more transformations between one or more meta-models of the PIM and one or more meta-models of the generated PSM; generating implementation artifacts; and binding the generated implementation artifacts with any existing services of the application.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the invention are apparent from the following detailed description in conjunction with the accompanying drawings in which:

DETAILED DESCRIPTION

Disclosed herein is a system and method for cross-platform porting of composite applications. As used herein, "composite applications" refers to a new business application that is created by combining multiple existing functions. Also as used herein, a "platform" refers to a software middleware platform such as IBM's WebSphere, SAP's NetWeaver, BEA's WebLogic, and Oracle's Fusion platforms.

Figure 1:
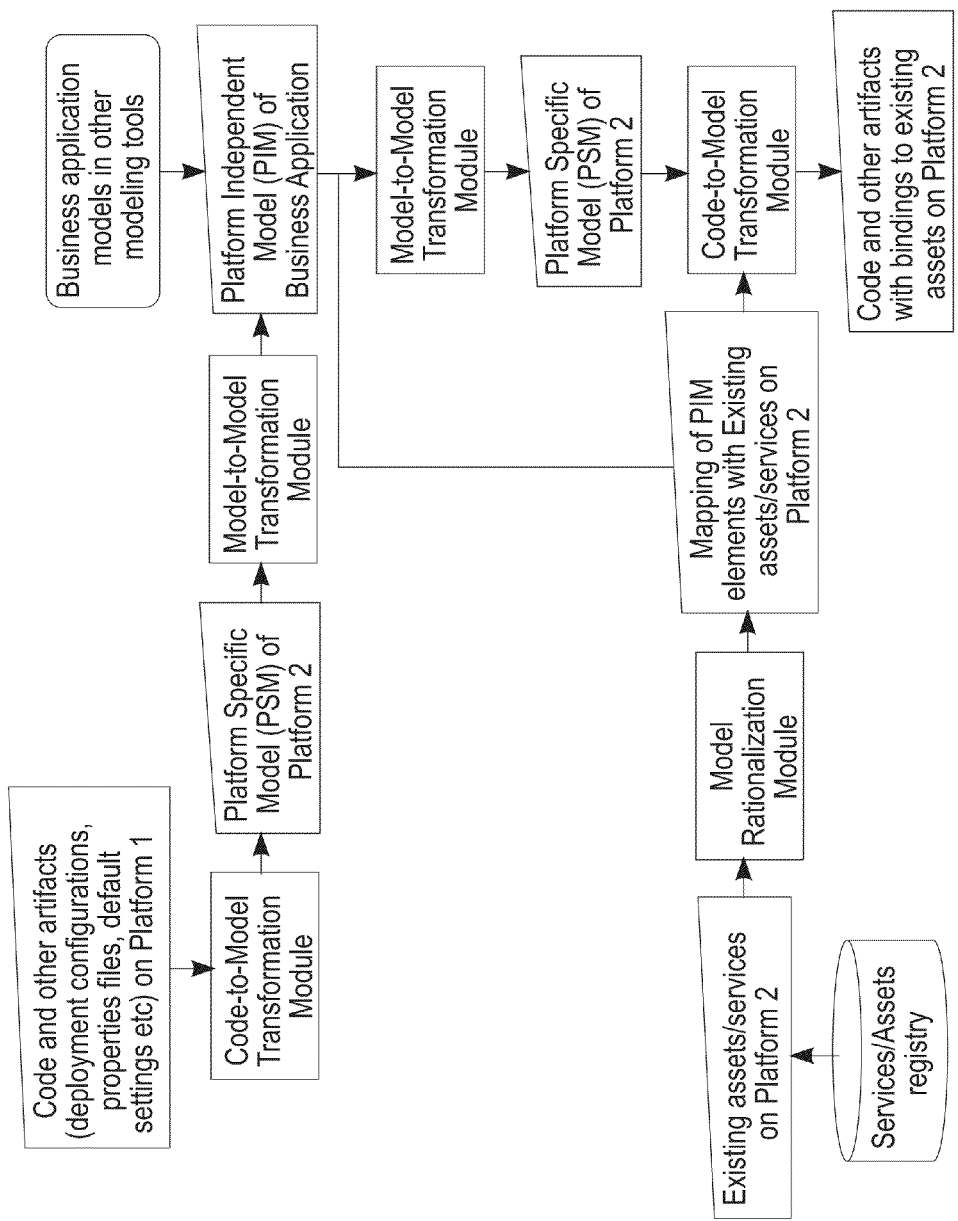
FIG. 1 is a block diagram of a method according to an embodiment of the invention for cross-platform porting of applications.

Extracting Platform Independent Models from Implemented Composite Applications Referring to the block diagram of FIG. 1, briefly stated, the existing implementation artifacts of the composite, application are transformed into a corresponding platform specific model. The various blocks illustrated in FIG. 1 are illustrated in general therein and are illustrated in more detail hereinafter in conjunction with various embodiments of the invention. A meta-model for each of the PSM and the to-be-extracted PIM are prepared and mapping rules are specified between the two meta-models. The mapping rules can be created manually or derived automatically via ontology mapping techniques. Once specified, model driven transformations that codify the mapping rules generate the PIM. The generated PIM may include the structural, behavioral and user experience models of the composite application. To enhance the reusability of the extracted PIM, the generated structural models are further modularized into higher-level services. Novel aspects of the transformations include extracting appropriate levels/granularity of services to enhance reusability of the extracted PIM models. Furthermore, these higher levels of abstraction enable the models to be linked with business objectives. Establishing this linkage is important for companies to understand and maintain their project portfolios. The reusable PIMs, thus generated, can then be translated into implementation artifacts on a different platform for a different client via model-driven transformations in the forward direction. This helps cut down the development time during project implementation, thereby resulting in reduced project durations and costs. Generating the implementation artifacts for contextually-aware applications includes utilizing a PIM of an application; generating a PSM from the PIM, wherein the generating of a PSM includes one or more transformations between one or more meta-models of the PIM and one or more meta-models of the generated PSM; generating implementation artifacts; and binding the generated implementation artifacts with any existing services of the application.

In accordance with an embodiment, the modeling notions of the OMG are enhanced in three ways: first, a "service" is used as a first-class modeling construct instead of a "class" in building the structural models. A service is a higher-level abstraction than a class. A service exposes its interface signature, message exchanges and any associated metadata and is often more coarse-granular than a typical class in an object-oriented paradigm. This notion of working with services rather than classes enables one to think of a business application as a composition of services. This higher-level abstraction is useful when deciding which model elements need to be transformed onto the target platforms and how to leverage existing assets in a client environment. This is so because the existing assets in a client environment can be wrapped as services with their associated metadata (if any) and can be rationalized with modeled services to ensure reuse of existing assets. It is more natural to do this rationalization at the level of services and their interfaces rather than at the level of classes. Operationally, a service is a class but conceptually it offers a higher level of abstraction which enhances the reusability of a PIM.

Second, the vocabulary is defined to express the user experience modeling elements using the "service" level abstractions. Several best practice models have been suggested about user experience modeling but no specific profile is readily available for use in expressing platform independent models. Herein, a profile is created that defines the language for expressing user experience modeling elements. These include stereotypes for information elements and layout elements. Information elements include screen, input form, and action elements that invoke services on the server side (called service actions) and those that invoke services locally on the client (non-service actions). Layout elements include text, table and chart elements.

Figure 3:
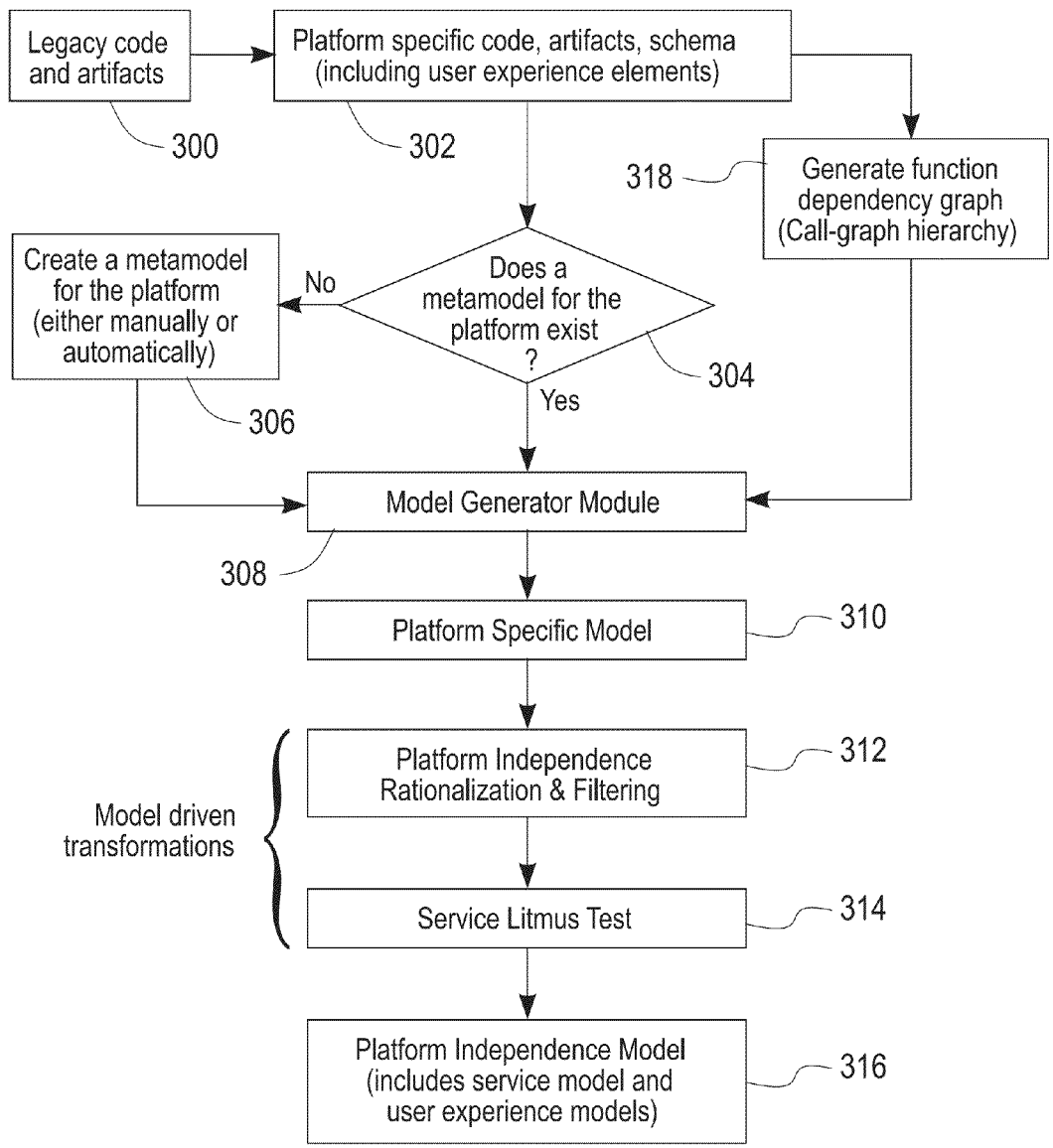
FIG. 3 is a more detailed flow diagram of the embodiment of FIG. 2.

Third, the linkage between the service model interfaces and user interface elements is derived from call-graph details and is specified declaratively in the PIM (FIG. 3-318). The method supports extraction of the service model interface to user interface element mapping to be done in various formats including XML and UML. The declarative mappings make the PIM platform independent and also cleanly separate the service model from the user experience model. This allows for the service model and the user experience model to be developed independently by different users if this derived PIM were to be later changed/refined for reuse. For example, a business analyst can refine the service model even while the user experience model is refined by the user experience professional.

Model driven development (MDD) and code generation from models is known. The notion of a layered model driven architecture evolved from the OMG. In OMG's view, models expressed in a well-defined notation are cornerstones to understanding systems for enterprise-scale solutions. The model driven architecture (MDA) approach comprises several steps apart from the model creation and transformation authoring aspects discussed above. MDA envisions model creation, analysis, transformation, composition, testing, simulation, extraction, and metadata management as important aspects of model driven development. Many commercially-available vendor tools provide support for some or all of these aspects to varying degrees. Generating implementation artifacts from models via transformations is referred to as forward engineering. Extraction of models from existing artifacts of a business application is termed reverse engineering.

Development of enterprise systems is viewed as an organization of a set of models built using a series of transformations between various levels of models. Building automated transformations between models is made possible by creating transformation (mapping) rules between the meta-models of the expressed models. Given two meta-models (e.g., a source meta-model and a target meta-model) and the transformation rules that can transform the source meta-model into the target meta-model, transformations can be built using tools offered by various tool vendors. Using these transformations, a PIM can be translated into a PSM and the PSM can then be translated into various implementation artifacts on the target platform. Other model translations are possible (e.g., PSM to PIM), as described in more detail hereinafter is accordance with embodiments of the invention. Extracting PIM from code and implementation artifacts is technically a much harder problem than generating code from models. The capabilities of tools in reverse engineering PIM modeling from artifacts are therefore minimal with many gaps.

Service Oriented Architecture (SOA) is a paradigm that uses a set of principles, policies, best practices, guidelines and technology capabilities to build IT systems (e.g., applications, infrastructure, etc.) that align with the business strategies and imperatives of an enterprise. In SOA, autonomous, loosely coupled and coarse-grained services with well-defined interfaces provide business functionality that can be discovered and accessed through a supportive infrastructure. This allows internal and external system integration as well as the flexible reuse of application logic through the composition of services supporting end-to-end business processes.

Different companies and schools of thoughts have developed various mechanisms and viewpoints on how to use the principles, best practices and guidelines of SOA to build well defined, consistent and complete models which are resilient to changes and adequately represent the solution to the problem domain. One such a school of thought from IBM is called Service Oriented Modeling and Architecture (SOMA). SOMA is a service oriented modeling and design technique that provides prescriptive guidance on how to develop a robust, scalable SOA solution aimed at enabling target business processes. At the heart of SOMA are the identification, specification and realization of business-aligned services that form the foundation for an SOA solution. During the identification phases, the technique applies a filtering mechanism by which it only identifies those services, from the candidate service list, that will be exposed. During the specification phase, the method provides prescriptive guidance and techniques on how to design the services—input and output messages, non-functional requirements and how to support them, dependencies of services on other services and technical components, composition of services to realize a part of or the entire business process and how services are implemented through service components, functional components and technical components. The realization phases of the method provide specific techniques to identify design and implementation decisions prescribing how to implement all the designed services to form a complete end-to-end SOA solution. In a sense, SOA enabled by the SOMA method provides higher level of abstractions during the building of platform independent models in the MDD technique. From this perspective, SOA elevates MDD to a higher level of abstraction thereby enabling the models to be linked with business objectives.

SOMA is a method for modeling and developing service-oriented IT solutions for enabling business processes. Other SOA methods operate in the same domain of modeling and building solutions. The method does not offer any mechanisms for deriving service-oriented models from implementation artifacts that are built using either service-oriented methods or other legacy. Therefore, the space of extracting PIM models from implementation artifacts in the context of service-oriented architecture is unexplored.

Figure 2:
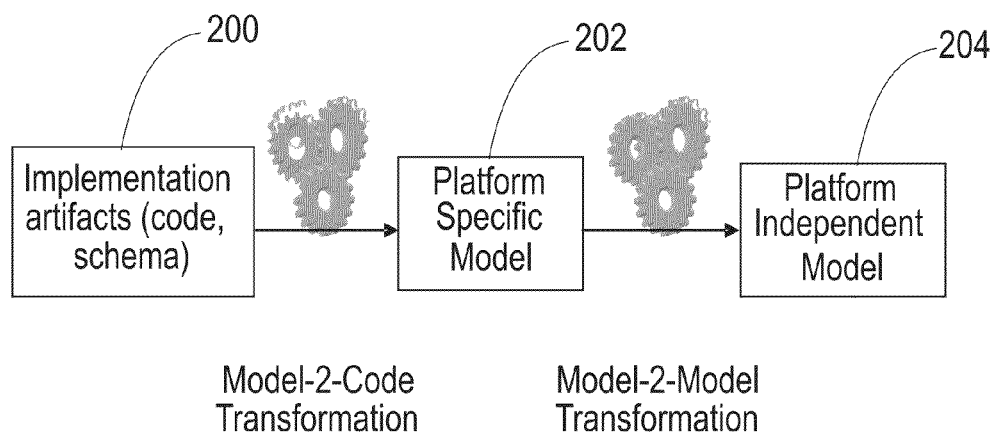
FIG. 2 is a block diagram of a method according to an embodiment for extracting a platform independent model from existing implementation artifacts of a composite application.

The objective of reverse engineering activities is to generate formal models (e.g., a PIM) from the implementation artifacts (e.g., code) of a composite application. Thus, the existing implementation artifacts are the starting point for this approach. Referring to FIG. 2, there illustrated in simplified block diagram form is an exemplary embodiment of a method of the invention for extracting or generating ("reverse engineering") a platform independent model from the existing implementation artifacts. The artifacts 200 typically include code and other artifacts such as database schema and user interface pages that run on a client's existing platform environment. Code-to-model transformations transform the artifacts 200 into a platform specific model (PSM) 202. The PSM 202 is then translated into the desired platform independent model (PIM) 204 via additional model-to-model transformations. At this point a PIM 204 of a given set of artifacts 200 has been extracted. The blocks of the method illustrated in FIG. 2 are described in greater detail hereinafter.

Traditional reverse engineering techniques have looked at extracting models from the code faithfully. For example, if a UML model were to be derived from a piece of Java code, reverse engineering techniques have looked at deriving structural models such as classes, their data members and interfaces, etc. However, in a service-oriented architecture, the modular reusable abstraction is defined at the level of services, and its operations, as noted above. In an embodiment of the invention, the approach is to analyze the platform specific artifacts and derive a platform independent model at the level of service abstractions that are appropriate for reuse in an SOA environment. The specific contributions in this aspect are discussed hereinabove.

FIG. 3 illustrates in more detail a flow diagram of an embodiment of the invention for converting platform specific artifacts into a platform independent model. The flow diagram may be implemented in software as modules or steps by a computer 2500 (FIG. 25), wherein the computer 2500 is described in more detail hereinafter. Platform specific legacy code and artifacts within a module 300, and platform specific code, artifacts, UI elements and schema (including user experience elements) within a module 302 are checked in a module or step 304 to determine whether or not a meta-model for the platform specific model exists. If no meta-model exists, a meta-model for the platform is created in a module or step 306. If a meta-model exists, then the implementation artifacts from the modules 300-302 are processed in a module or step 308 in a Model Generator Module to generate a platform specific model in a module 310. The platform specific legacy code, artifacts, UI elements, schema, etc. may be present in many forms and formats including code written in programming languages such as Java, or C, or C++ and schema and other artifacts represented as XML files or other files.

The Model Generator Module 308 processes the platform specific artifacts in their various formats and extracts a platform specific model from them. In order to do this, the Module has to know the meta-model of the underlying platform. If one exists, then the implementation artifacts can be mapped to such a platform specific model by the Module 308. But in cases where one does not exist, a platform specific model is derived or created in the module or step 306 from fully representative examples. This process of deriving or creating a platform specific model in the module 306 can be performed either automatically or manually or by a combination of both. Automatic creation of platform specific models is possible if the interfaces of the target platform implementation artifacts are homogenous and the exemplar from which the platform specific model is to be derived is complete. In this context an exemplar is considered complete if it consists of one instance of each kind of artifact that could possibly exist on that platform. Schema generation is then possible via known reverse engineering techniques from existing artifacts. Different vendor tools offer varying capabilities on this front to derive a meta-model automatically.

Once a platform specific model is obtained, it is rationalized and filtering is performed in a module or step 312 to extract only those elements that are of "value" at the platform independent level in an SOA environment. The rationalization and filtering mechanism can employ certain predefined rules to perform these functions. For example, models of artifacts such as factory classes for business objects, and auxiliary data structures and code that setup environment variables and connectivity with legacy systems, etc. need not be translated onto platform independent models. These types of business objects, data structures, application services, their operations are cleansed and filtered in this module 312. Then from the platform specific model, service models are extracted and applied a service litmus test in a module or step 314 (as given in SOMA method) to categorize services as process services, information services, security services, infrastructure services, etc. The SOMA method defines these categories of services. Each service along with its ecosystems of services can be examined in detail to derive this information either automatically or manually. Once done, additional tagging is performed on services to note which ones are exposed externally and which ones are internal implementations. The litmus test module 314 can be administered manually or can be automated if there is enough semantic information about the code/artifacts to know about the behavior and characteristics. This along with the user experience elements and models are all extracted into a platform independent model in a module or step 316 via model-driven transformations.

In addition one can generate a call-graph hierarchy on the platform specific code in a module or step 318 which gives out a report on which classes/functions are calling which other classes/functions. Several techniques have been proposed in literature on constructing call graph hierarchies. Embodiments of the invention are concerned with the results of call-graph hierarchy rather than constructing a call-graph hierarchy. This information is captured and reflected in the platform specific model by the Model Generator Module 308 which then gets translated into a platform independent model via model driven transformations. This helps generate a service dependency model at the platform independent model. The service model and the service dependency information together provide static and the dynamic models at the platform independent level.

Transformations create elements in a target model or domain based on elements from a source model. A model driven transformation is a set of mapping rules that define how elements in a given source model map to their corresponding elements in a target domain model. These rules are specified between the source and target platform meta-models. As shown in FIG. 2, depending on what needs to be generated there could be multiple levels of transformations such as model-to-model, model-to-text, and model-to-code.

Also, depending on the source and target platforms, multiple levels of transformations might be required to transform implementation artifacts to a PIM. For example, transformations may be required across models of the same type such as a transformation from one PSM to another PSM to add additional levels of refinement or across different levels of abstraction such as from PSM to PIM or from one type of model to another such as from code to PSM or even code to PIM. Traditional code to PSM and PSM to PIM transformations may be used, as shown in FIG. 2. Operationally, multiple levels of transformations can be chained so that the intermediate results are invisible to the consumer of the transformations.

As mentioned above, one of the precursors to defining transformations is the availability of meta-models of the source and target domains or platforms for which transformations need to be specified. Often one of the platforms is more abstract than the other. In an exemplary embodiment, a meta-model may be the meta-model of the elements expressed in UML 2.0, and the service level abstractions offered by the SOMA method and the created user experience model. If access to the meta-models of these elements is available, then the meta-model of the overlying model is relatively well understood.

One of the challenges in realizing the model driven transformations is knowing the meta-model of the various platforms. In cases where the implementation platforms are proprietary, extracting the meta-model of these platforms can be an engineering challenge. For example, the full meta-models of SAP NetWeaver's WebDynPro and Guided Procedures modules are unpublished and are difficult to create without exemplars. Working with concrete models is more intuitive for most developers than to work with meta-models. Therefore, best practice suggests that an exemplar be created and then the meta-model is reverse engineered from the exemplar. An exemplar is an example solution that one would like the transformations to produce. This means that an exemplar has to be completed with at least one instance of all types of possible model elements. An exemplar could be a single XML file or a collection of code artifacts (such as java files) or a combination. In addition, creating an exemplar helps to obtain a picture of what needs to be produced. Once an exemplar is created, a meta-model can be extracted therefrom using various code-to-schema extraction tools.

In an embodiment of the invention, a simple instance of a business application that an IT services company may have relates to trade promotions management. Trade promotions are incentives paid by consumer products manufacturers to retailers for merchandising support. Typically, a key account manager creates trade promotions after deciding which products need to be promoted. To accomplish this, the manager establishes "promotion groups" comprising groupings of products to be promoted. Once the promotion offer details are finalized, the manager submits these trade promotions for approval to a trade marketing manager. The trade marketing manager has the overall responsibility to manage the calendar of trade promotions being offered to each retailer each month. The trade marketing manager reviews the trade promotions submitted by the key account manager for a given retailer and approves or rejects the trade promotions as the case may be. Usually, computer implementation of a trade promotion involves multiple parties and integration of many systems. These systems are often implemented by different vendors on different platforms. For example, a service that retrieves a list of all available products for promotion offering may be available on a client's SAP ERP system. With the trade promotions management solution deployed at the client site, the trade promotions management solution is integrated with the appropriate system interfaces of the SAP system. However, each client's environment may differ from one another in that another client may have some other system for offering the same function. In addition, some clients might prefer their solutions be on specific development and corresponding runtime platforms such as the IBM WebSphere, Oracle/BEA, and SAP NetWeaver platforms for a number of reasons including the availability of in-house skills for project development and maintenance, availability of software licenses, and feature preference of the software. Therefore, IT services companies are faced with the challenge of dealing with multiple client legacy systems, the details of which may not be known upfront.

Figure 4A:
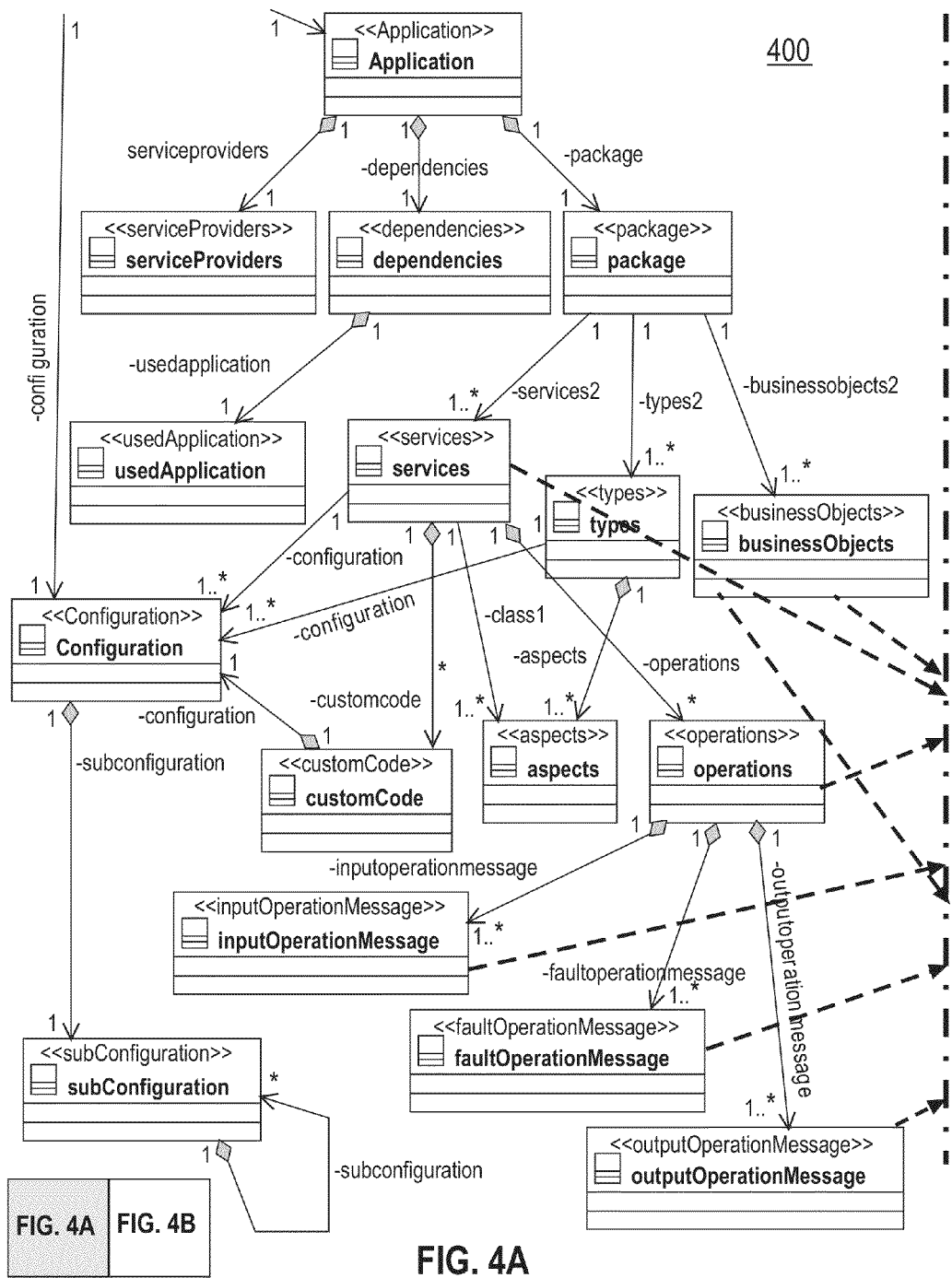
FIG. 4 illustrates the transformation mappings between the service elements of the meta-models of the SAP Composite Application Framework (CAF) PSM and the PIM, wherein the SAP CAF is an exemplar PSM used to illustrate the PSM-to-PIM transformations.
Figure 4B:
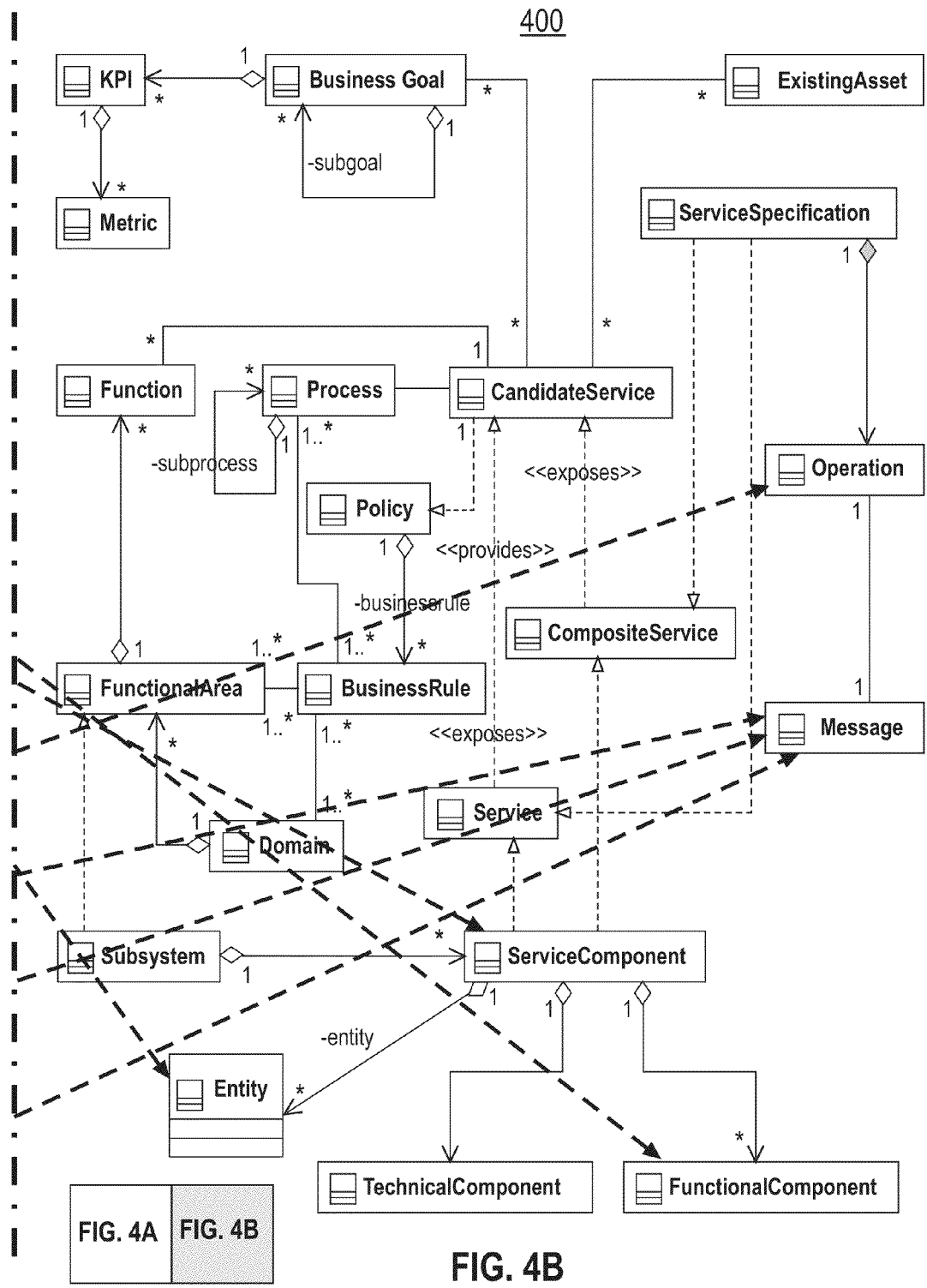
Figure 5B:
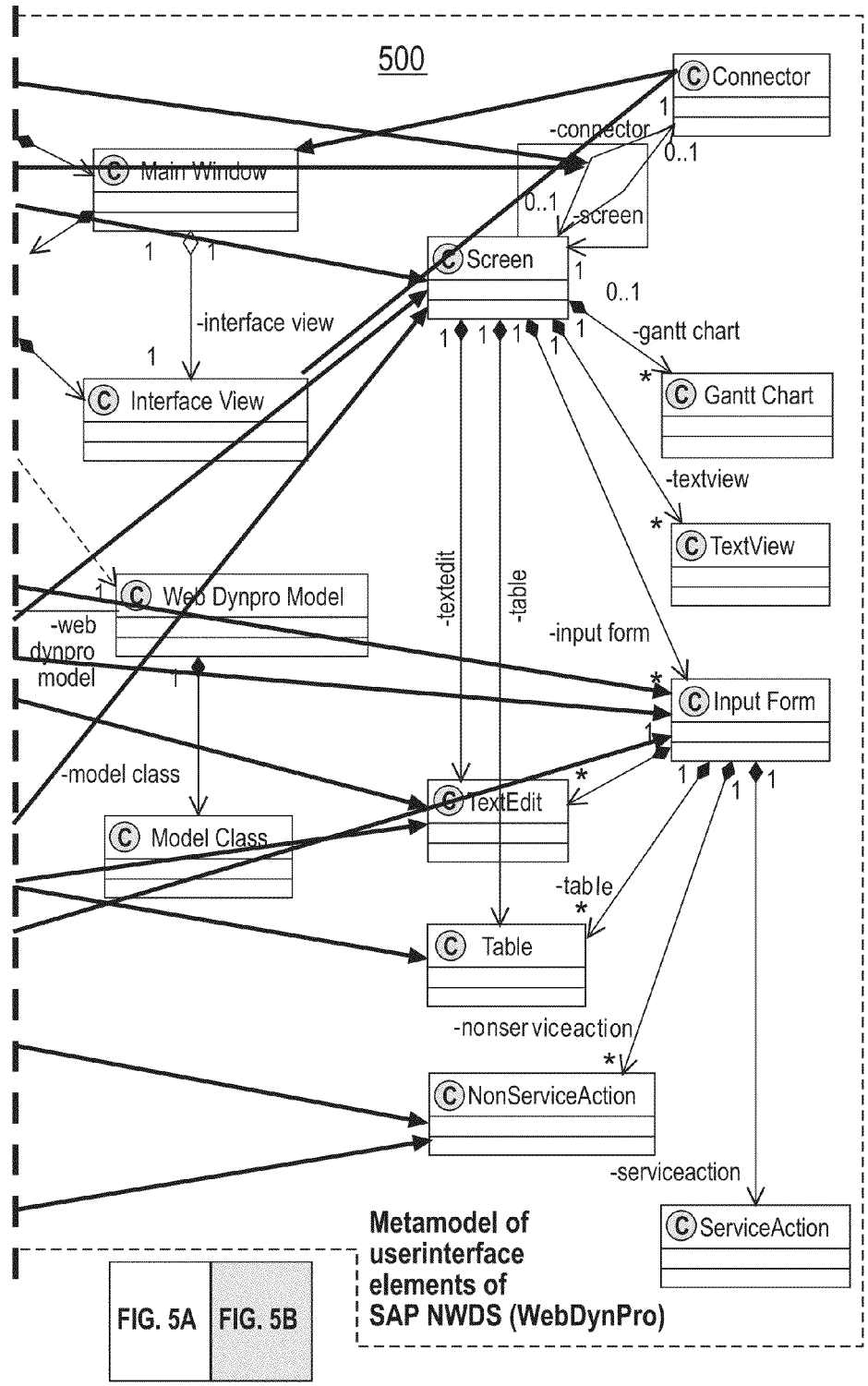
FIG. 5 illustrates the transformation mappings between the SAP NetWeaver WebDynPro module PSM and the user experienced PIM.

In accordance with the exemplary embodiment of the present invention, FIGS. 4 and 5 illustrate the transformation rules between the meta-model of the PSM, developed, for example, in the SAP NetWeaver composite application framework (CAF), and the meta-model of the PIM. Specifically, FIG. 4 shows the transformation mappings 400 between the service elements of the meta-models of the SAP CAF PSM and the PIM. FIG. 5 shows the transformation mappings 500 between the SAP NetWeaver WebDynPro module (i.e., the PSM) and the user experienced PIM. These transformation mapping rules may be developed, for example, using the IBM RSA transformation authoring tool. The transformation rules may be developed manually through observation and domain analysis. Automated ways of deriving transformation rules are being researched.

Figure 6:
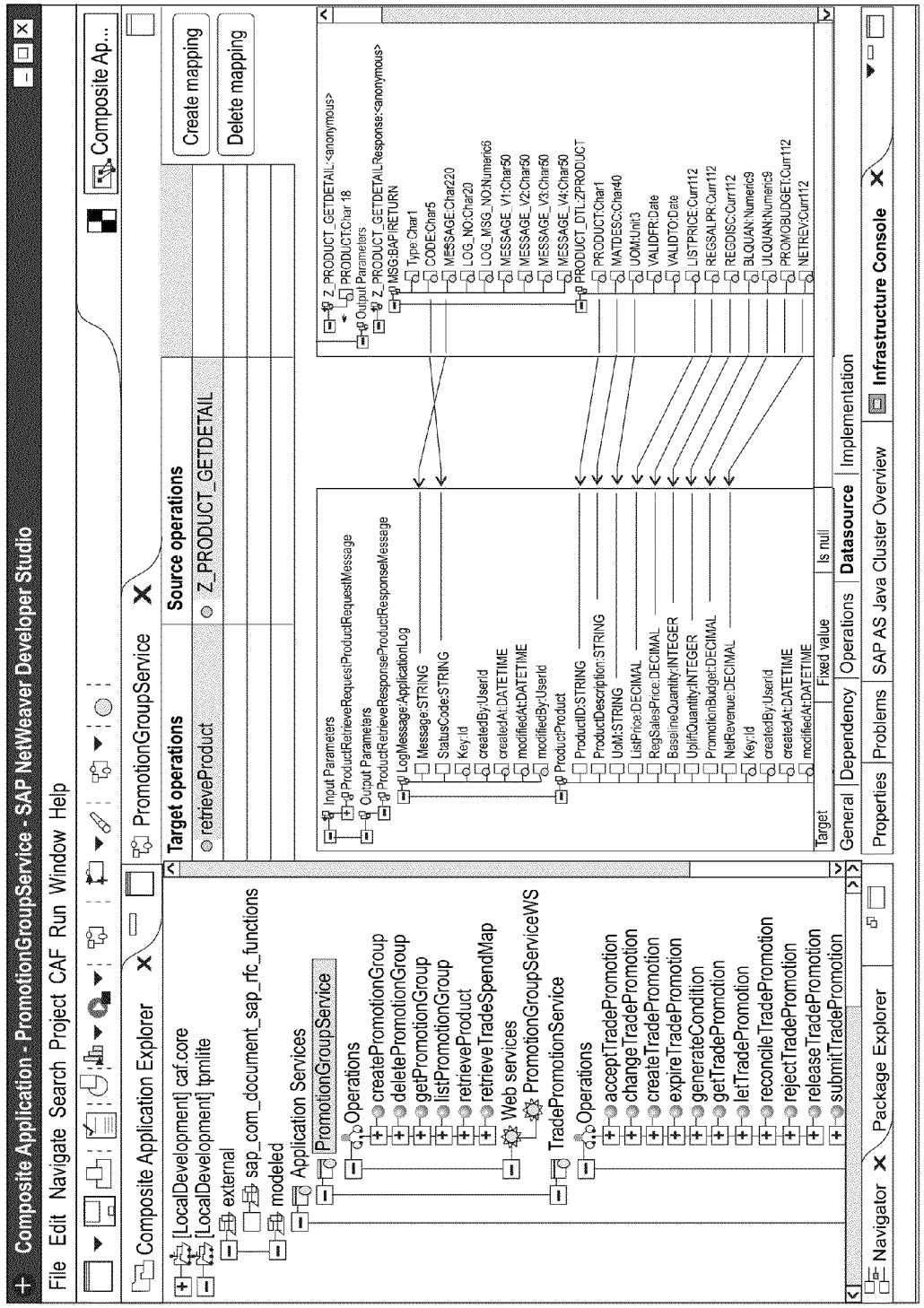
FIG. 6 illustrates the implementation artifacts of the composite application for the exemplary trade promotions scenario developed using the SAP NetWeaver tool.
Figure 7:
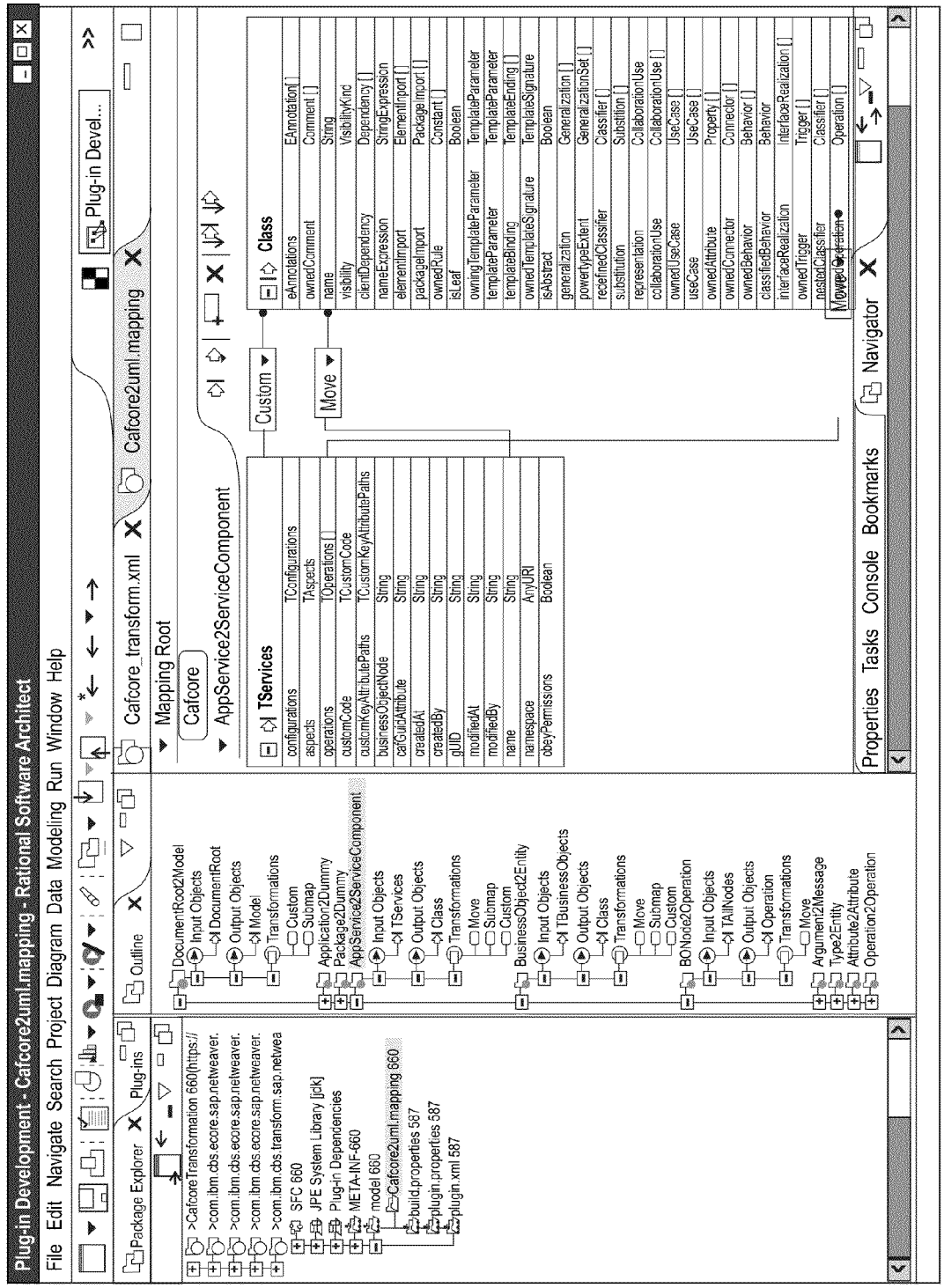
FIG. 7 illustrates the mappings from the SAP NW CAF-Core PSM into the PIM of FIG. 2.
Figure 8:
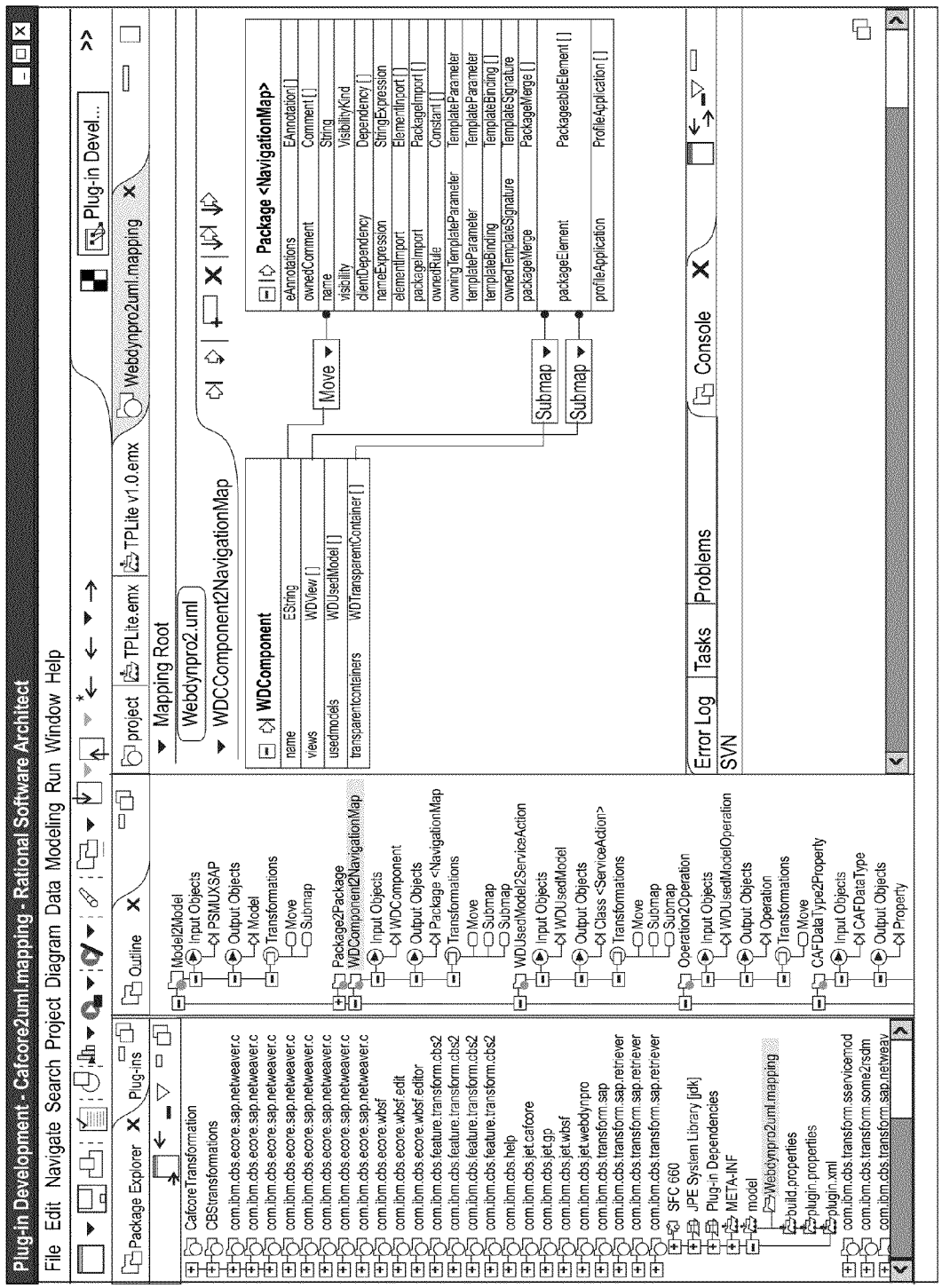
FIG. 8 illustrates the mappings from the SAP NW WebDynPro PSM into the PIM of FIG. 2.

FIG. 6 illustrates the composite application for the exemplary trade promotions scenario developed using the SAP NetWeaver tool. Specifically, FIG. 6 illustrates the visual model of the implementation artifacts (i.e., the code, XML files) 200 in the block diagram of FIG. 2 of the exemplary trade promotions embodiment of the present invention. It is the representation artifacts of the visual model shown that will undergo the code to model ("reverse") transformations to generate the PSM 202 of FIG. 2. In addition, FIG. 7 illustrates the reverse mappings from the SAP NW CAFCore PSM 202 into the PIM 204 of FIG. 2, while FIG. 8 illustrates the reverse mappings from the SAP NW WebDynPro PSM 202 into the PIM 204 of FIG. 2.

Figure 9:
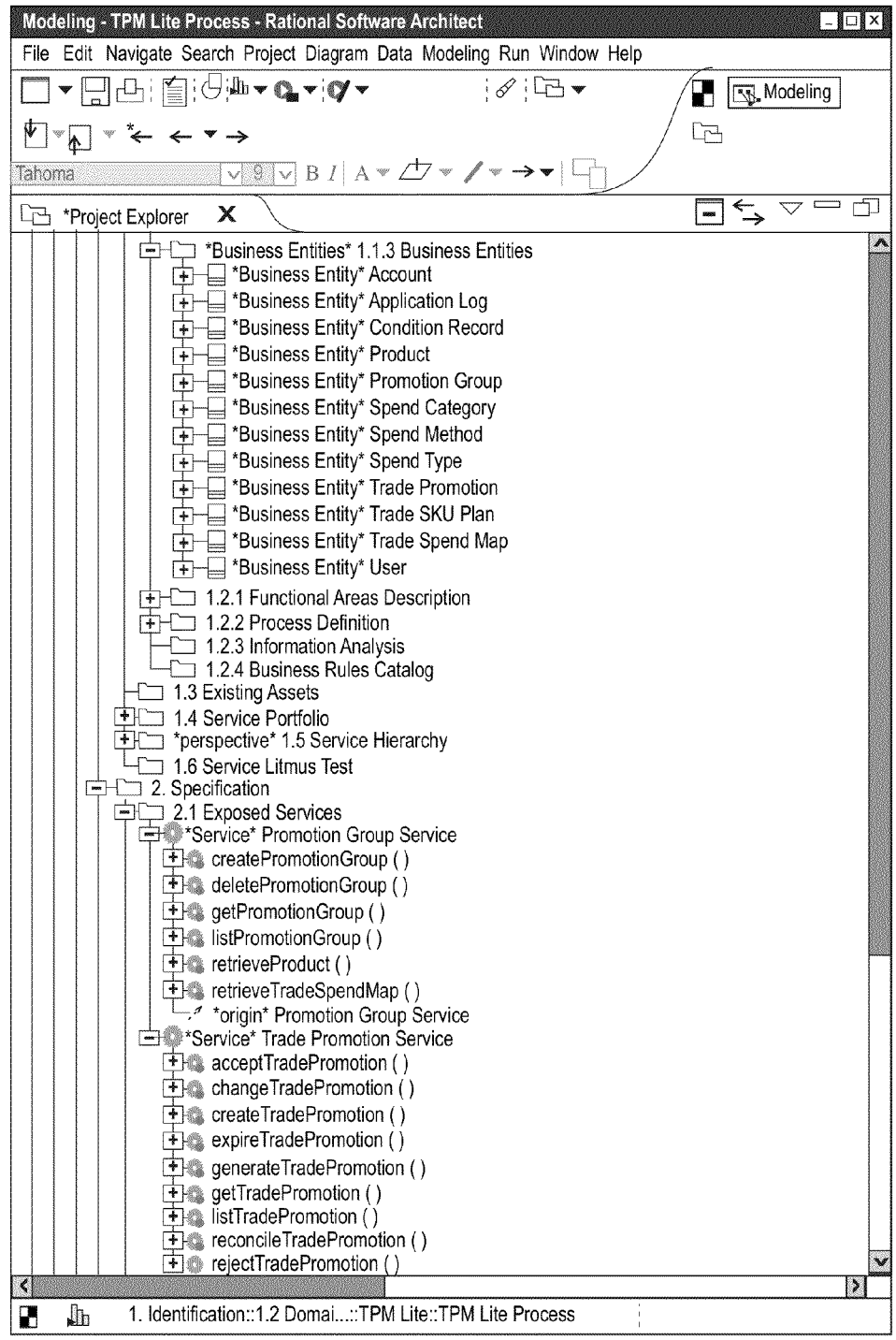
FIG. 9 illustrates the generated business entities, services and their interfaces.
Figure 10:
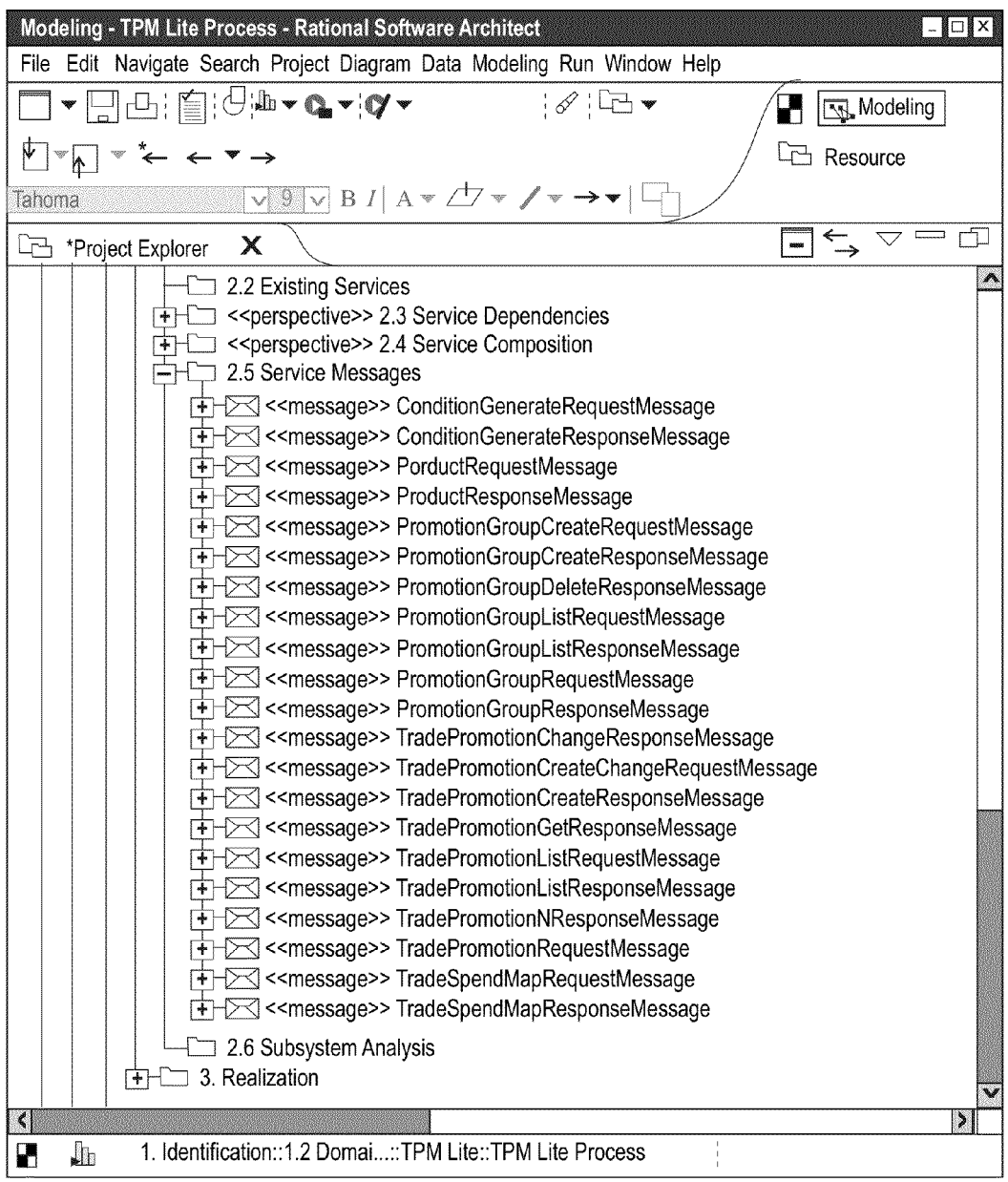
FIG. 10 illustrates the generated message objects that are exchanged via the service interface.
Figure 11:
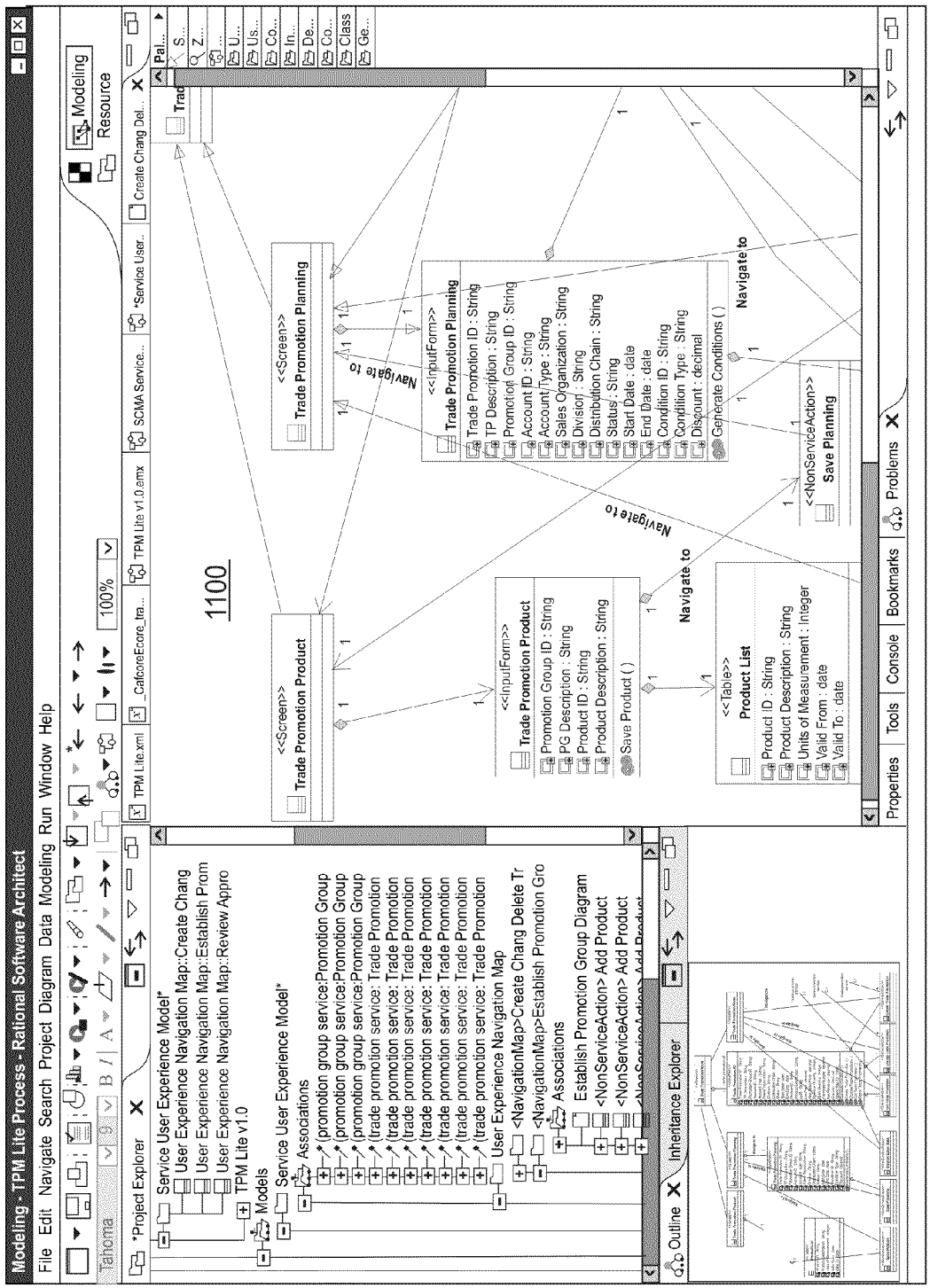
FIG. 11 illustrates the generated user experience PIM of the trade promotions management scenario modeled using the vocabulary defined in the user experience profile.

FIGS. 9 and 10 illustrate the output of the reverse transformations. These are the outputs of service identification via process decomposition step in the SOMA method—a substep of the Platform Independent Rationalization and Filtering step in FIG. 3. As noted earlier, candidate services discovered via process decomposition are passed through a service litmus test according to the SOMA specification. Some of the candidate services may be deemed too low level during this phase and, as a result, are delegated to lower level technical or functional components while the remaining services are exposed as services. Specifically, FIG. 9 shows the business entities, services and their interfaces derived for the exemplar 900 described above. FIG. 10 shows the messages 1000 that are exchanged via the service interfaces of exposed services. FIG. 11 shows the user experience PIM 1100 of the trade promotions management scenario modeled using the vocabulary defined in the user experience profile.

In general, extracting the meta-models for non-standards based and proprietary platforms is an engineering challenge. Depending on the platform, varying amounts of manual effort may be required to extract the meta-modal of the platform. If the meta-models are not published or not accessible, then one may have to resort to manual observation of exemplars to derive the meta-model from the exemplar. This means an exemplar with all possible types of elements needs to be constructed. The meta-model extraction may be automated. Some tool vendors including IBM's Rational Software Architect (RSA) provide exemplar analysis tools to investigate and extract meta-models from exemplars.

Generating Implementation Artifacts from Platform Independent Models

Also disclosed herein in an embodiment is a system and method for generating implementation artifacts for contextually-aware business applications. Briefly stated, a model driven technique to generate implementation artifacts on a target platform from platform independent models while leveraging the existing assets in a client environment includes applying semantic Web service matching technology to achieve automatic binding of generated artifacts with available client assets. The platform independent models can be generated via reverse engineering techniques such as the one described above or by manually creating them. In the second aspect of the invention, implementation artifacts are generated from these PIM models. The generated implementation artifacts on the target platform leverage existing client assets in the target environment. The ability to leverage existing assets in the target environment makes the generated business application implementation artifacts "contextually-aware." By generating implementation artifacts that are well informed about and bound where appropriate with clients' existing functionality, the invention helps reduce the development time during project implementations, thereby resulting in reduced project durations and costs.

As mentioned hereinabove, model driven development (MDD) and code generation from models is known. The notion of a layered model driven architecture evolved from the Object Management Group (OMG). In OMG's view, models expressed in a well-defined notation are cornerstones to understanding systems for enterprise-scale solutions. Development of enterprise systems is viewed as an organization of a set of models built using a series of transformations between various levels of models. Building automated transformations between models is made possible by creating transformation rules between the meta-models of the expressed models. Given two meta-models (e.g., a source meta-model and a target meta-model) and the transformation rules that can transform the source meta-model into the target meta-model, transformations can be built using tools offered by various tool vendors. Using these transformations, a PIM can be translated into a PSM and the PSM can then be translated into various implementation artifacts on the target platform. Tool vendors (e.g., IBM's Rational Software Architect—"RSA") support transformation authoring, code generation in general, and also provide ready-made transformations from recommended PIM languages such as UML to their specific platforms, e.g., an IBM WebSphere platform.

The MDA approach comprises several steps apart from the model creation and transformation authoring aspects discussed above. MDA envisions model creation, analysis, transformation, composition, testing, simulation, extraction, and metadata management as important aspects of model driven development. Many commercially available vendor tools provide support for some or all of these aspects to varying degrees. Generating implementation artifacts from models via transformations is referred to as forward engineering. Extraction of models from code and legacy is termed reverse engineering.

Figure 12:
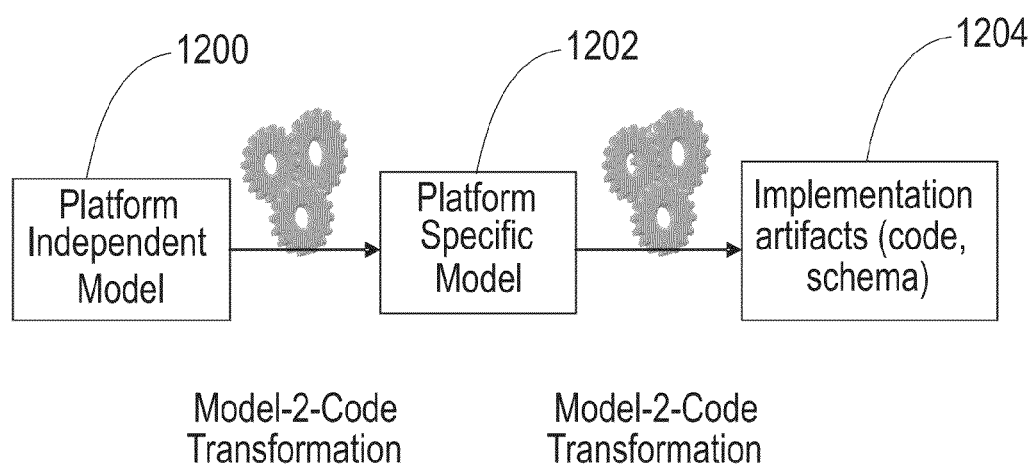
FIG. 12 is a block diagram of a method according to an embodiment for generating implementation artifacts from a platform independent model.

The objective of forward engineering activities is to generate implementation artifacts from formal models. Creating formal models is the starting point for this approach. Referring to FIG. 12, there illustrated in simplified block diagram form is an embodiment of a method for generating implementation artifacts from a platform independent model. The functional specification of a business application is modeled at a platform independent level in UML in a block 1200. This formal PIM is then translated into a platform specific model in a block 1202 using a model-to-model transformation. The generated PSM is then converted into various implementation artifacts such as code and database schema via a model-to-code transformation in a block 1204.

In the process of creating platform independent models, it is assumed that a Computation Independent Model (CIM) exists. Thus, the starting point is the creation of a PIM. Model creation, transformation, and composition principles of MDA are used in building platform independent models. IBM's RSA tool may be used for model creation. IBM's SOMA method and the corresponding tool, SOMA-ME (SOMA Modeling Environment), may be used to model the PIM and enhance it with user experience models. PIM models are typically represented in UML.

In creating platform independent models, the objective is to model enough detail at the platform independent level to enable transformation of this model onto the target platforms of choice. In the present invention, the focus is on transformation of process models, user experience models, and the exposed (to external parties) application services. The detailed design that supports the functionality of application services is not explicitly modeled and addressed because commercial tools are already available to transform UML models of detailed design to Java J2EE and EJB models. The key issue in building platform independent models is identifying the necessary and sufficient set of common modeling elements to construct a PIM for composite business services such that a rich enough set of platform specific modeling elements can be created via translation (either fully or partly automatically) onto different platforms.

OMG provides some guidance on how to build platform independent models. Many tool vendors support the development of platform independent models. UML is the popular language of choice in the industry for representing platform independent models. In the present invention, the OMG modeling notions are enhanced in two ways.

In the first way, a "service" is used as a first-class modeling construct instead of a "class" in building the structural models. A service is a higher-level abstraction than a class. A service exposes its interface signature, message exchanges and any associated metadata, and is often more coarse-granular than a typical class in an object-oriented paradigm. This notion of working with services rather than classes enables one to think of a business application as a composition of services. This higher-level abstraction is useful when deciding which model elements need to be transformed onto the target platforms and how to leverage existing assets in a client environment. This is so because the existing assets in a client environment can be wrapped as services with its associated metadata (if any) and can be rationalized with modeled services to ensure reuse of existing assets. It is more natural to do this rationalization at the level of services and their interfaces rather than at the level of classes. Operationally, a service is a class but conceptually it offers a higher level of abstraction.

In the second way, the vocabulary to express the user experience modeling elements is defined using the "service" level abstractions. Several best practice models have been suggested about user experience modeling but no specific profile is readily available for use in expressing platform independent models. A profile is created that defines the language for expressing user experience modeling elements. These include stereotypes for information elements and layout elements. Information elements include screen, input form, and action elements that invoke services on the server side (called service actions) and those that invoke services locally on the client (non-service actions). Layout elements include text, table and chart elements.

Figure 13:
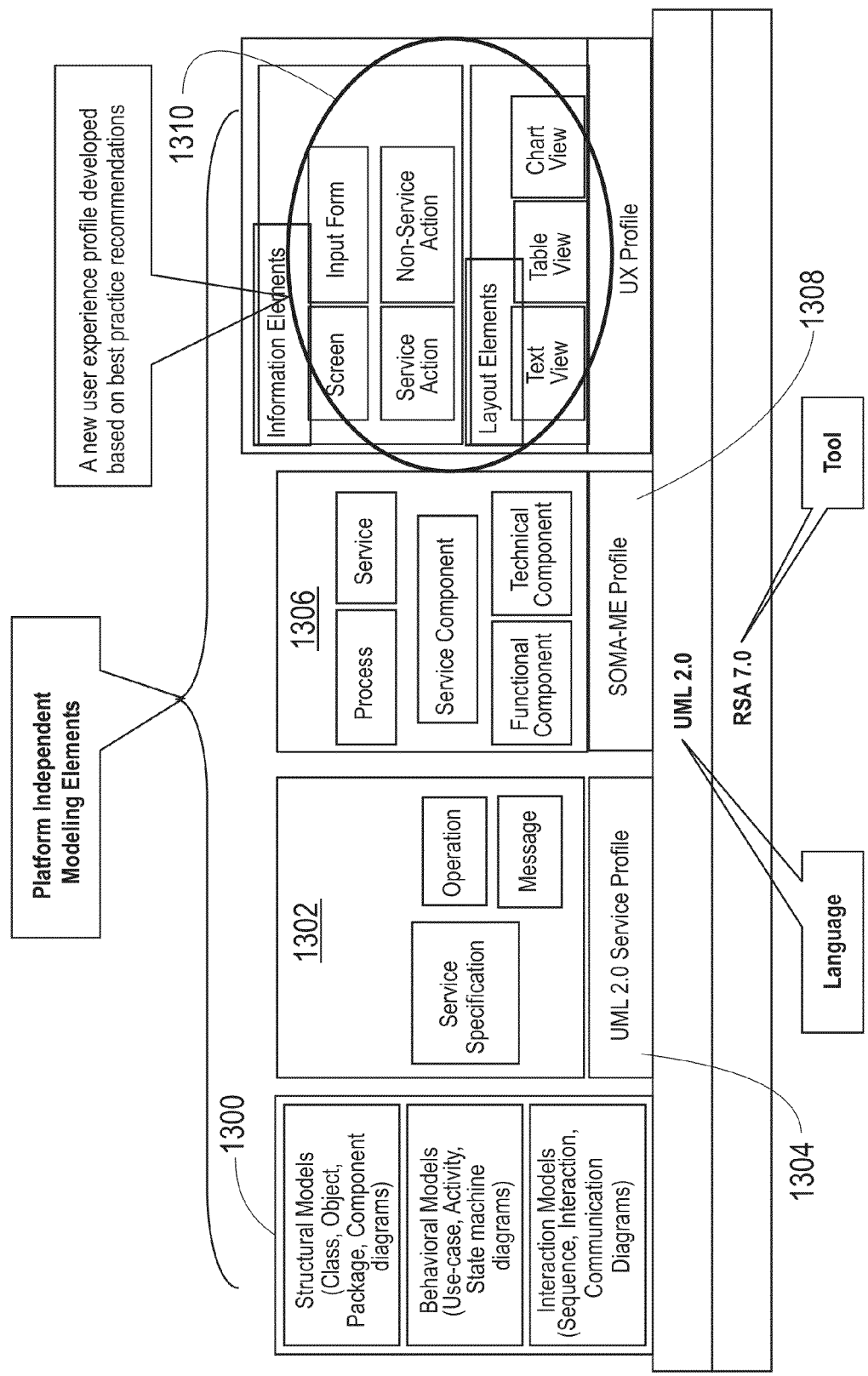
FIG. 13 is a layered diagram that illustrates a set of modeling elements used to build platform independent models of a given functional specification.

FIG. 13 illustrates a set of modeling elements used to build platform independent models of a given functional specification. To the left in FIG. 13 are the traditional UML 2.0 modeling constructs 1300, namely the structural, behavioral and interaction models. These models are then elevated to a higher level of abstractions as services 1302 using the UML 2.0 service profile 1304 up on which additional modeling constructs 1306 of SOMA-ME are built. The UML 2.0 service profile 1304 and SOMA-ME profile 1308 together provide the vocabulary needed to express the service level abstractions of the functional specifications. Finally, the new user experience profile 1310 developed based on the best practice recommendations yields the vocabulary required to capture the user interface modules. From this, a PIM can be created either manually or can be generated via reverse transformations as noted above in this invention.

In an embodiment of the invention, a simple instance of a business solution that an IT services company may want to develop upfront and bring to market as a solution relates to trade promotions management. Trade promotions scenario has already been explained above in this invention. We use the same exemplar to illustrate the generation of implementation artifacts from PIM models in this portion of the invention.

Figure 14A:
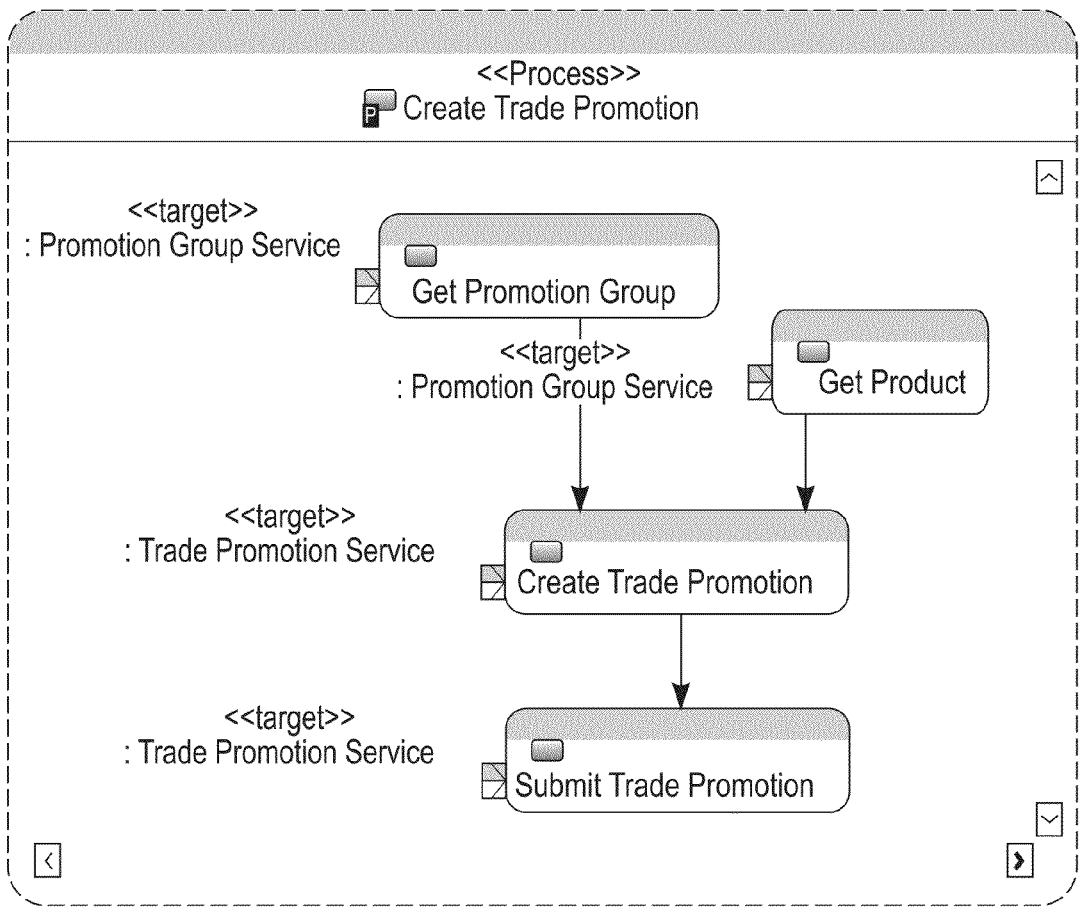
FIG. 14 illustrates the behavioral model of an exemplary trade promotions management scenario using activity diagrams.
Figure 14A:
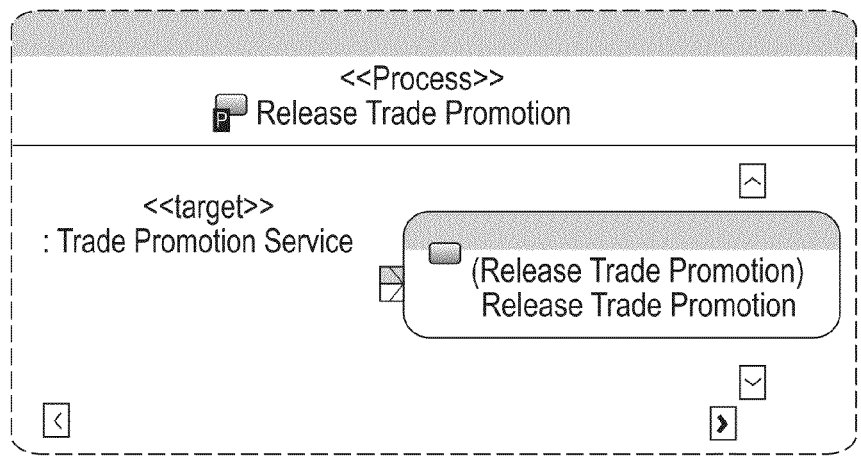
Figure 14B:
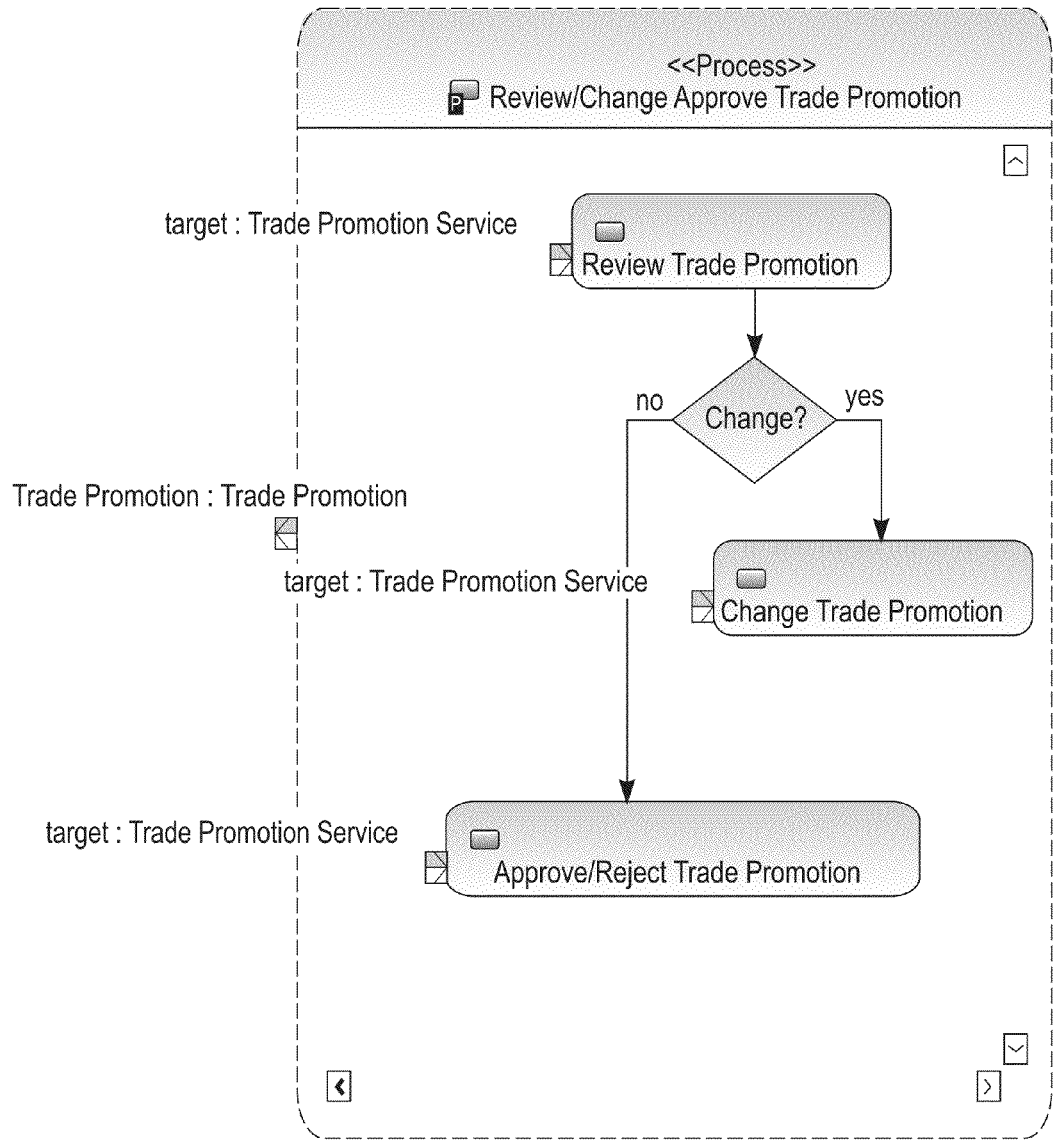

FIG. 14 illustrates the behavioral model of the trade promotions management scenario using upfront with the need to support these solutions on multiple platforms and to integrate activity diagrams. Specifically, FIG. 14A illustrates the creation of a trade promotion process 1400 as performed by the key account manager. FIG. 14B illustrates the actions 1402 performed by the trade marketing manager who reviews and approves the trade promotions.

Figure 15A:
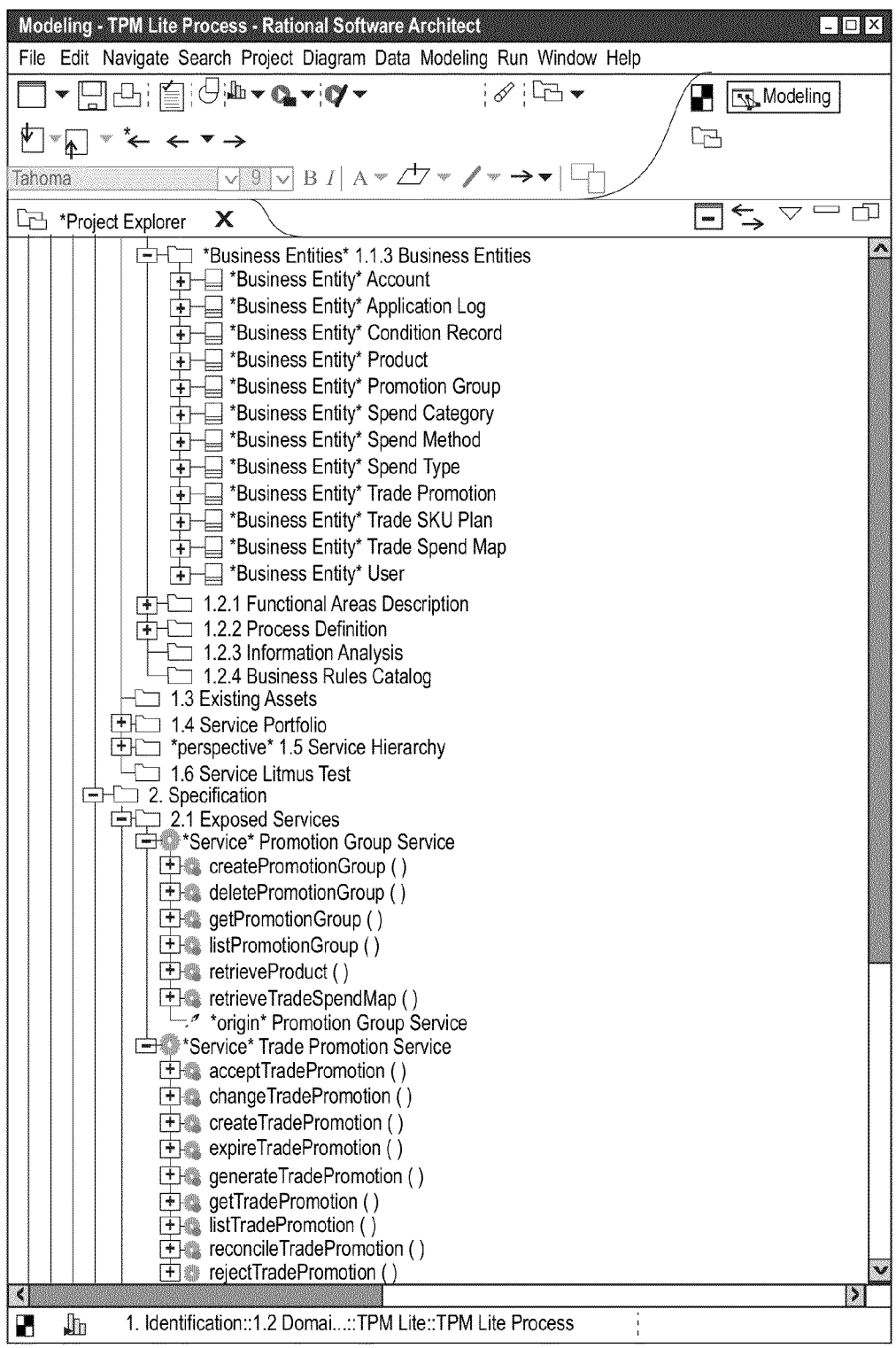
FIG. 15 illustrates the identification via process decomposition of the exposed services and business entities.
Figure 15B:
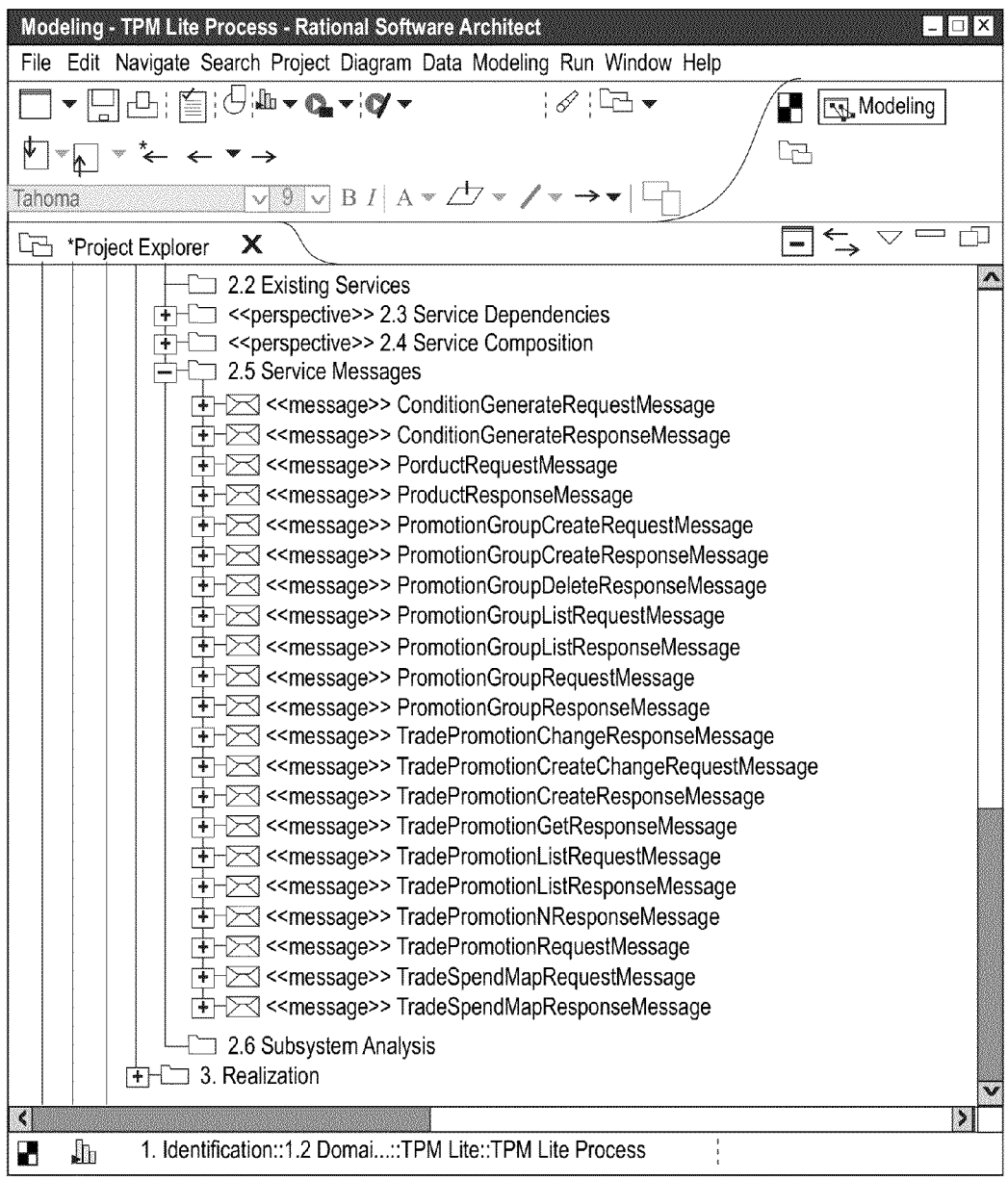
Figure 16A:
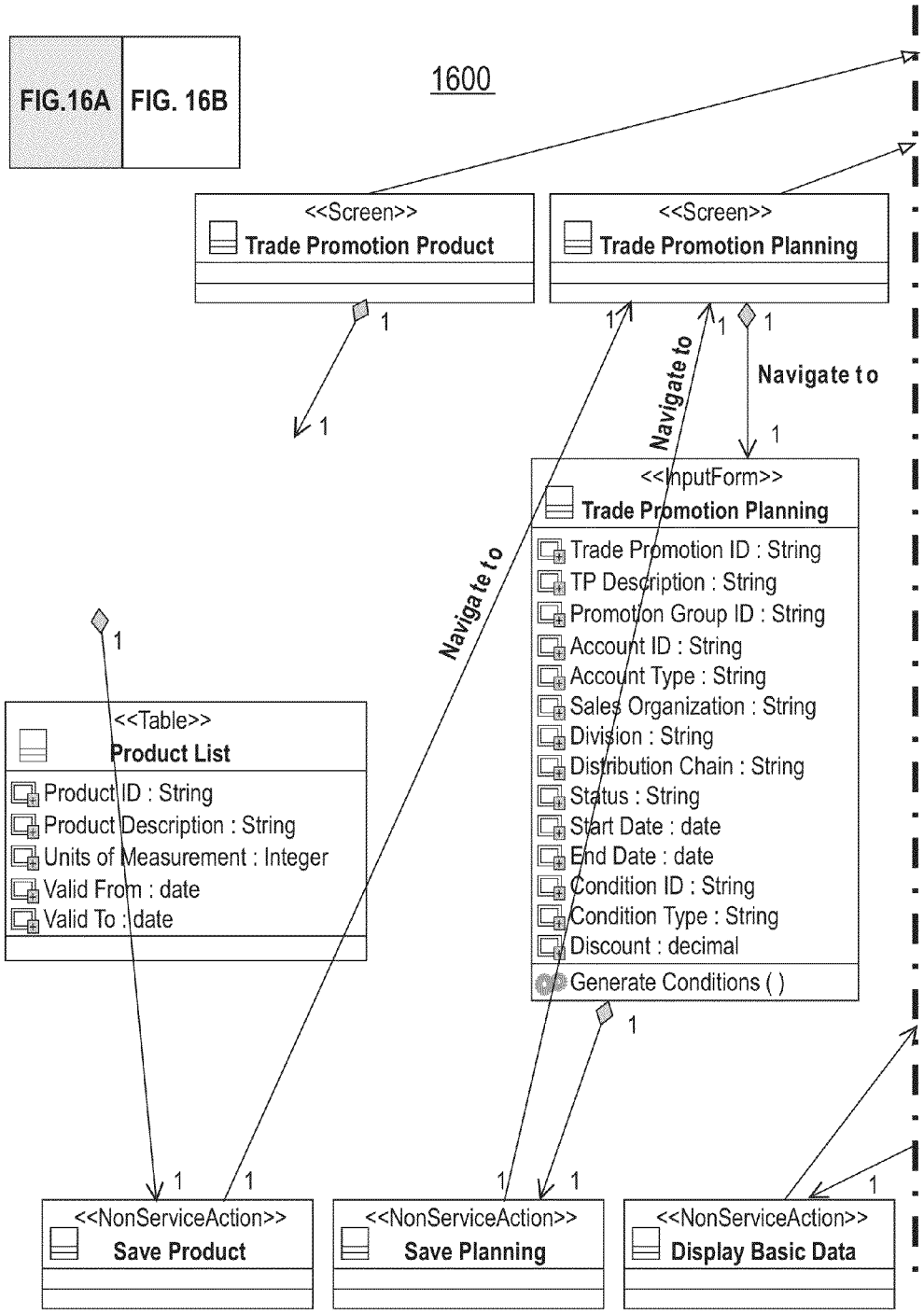
FIG. 16 illustrates the user experience model of the exemplary trade promotions management scenario modeled using the vocabulary defined in a user experience profile.
Figure 16B:
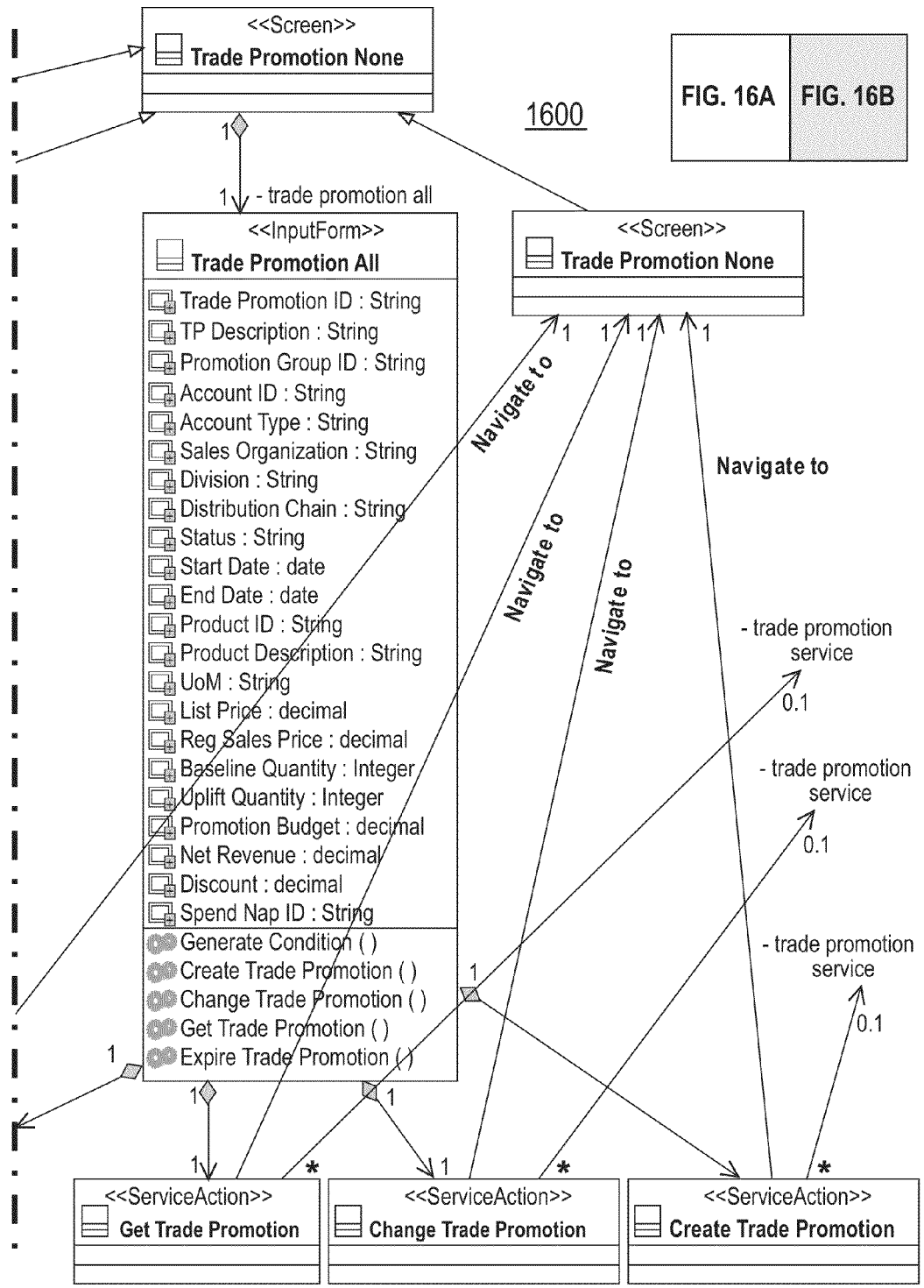

FIG. 15 illustrates the identification via process decomposition of the exposed services and business entities, which is a step in the SOMA method. Candidate services discovered via process decomposition are passed through a service litmus test according to the SOMA specification. Some of the candidate services may be deemed too low level during this phase and, as a result, are delegated to lower level technical or functional components while the remaining services are exposed as services. Specifically, FIG. 15A shows the business entities, services and their interfaces 1500. FIG. 15B shows the messages 1502 that are exchanged via the service interface. FIG. 16 shows the user experience model 1600 of the trade promotions management scenario modeled using the vocabulary defined in the user experience profile.

Transformations create elements in a target model or domain based on elements from a source model. A model driven transformation is a set of mapping rules that define how elements in a given source model map to their corresponding elements in a target domain model. These rules are specified between the source and target platform meta-models. As shown in FIG. 12, depending on what needs to be generated there could be multiple levels of transformations such as model-to-model, model-to-text, and model-to-code.

Also, depending on the domain and the desired target platform, multiple levels of transformations might be required to transform a PIM into implementation artifacts on a target platform. For example, transformations may be required across models of the same type such as a transformation from one PSM to another PSM to add additional levels of refinement or across different levels of abstraction such as from PIM to PSM or from one type of model to another such as from PSM to code or even PIM to code. Traditional PIM to PSM and PSM to code transformations may be used as shown in FIG. 12. Operationally, multiple levels of transformations can be chained so that the intermediate results are invisible to the consumer of the transformations.

As mentioned above, one of the precursors to defining transformations is the availability of meta-models of the source and target domains or platforms for which transformations need to be specified. Often the source domain is more abstract than the target domain. In the exemplary embodiment of the present invention, the source domain meta-model is the meta-model of the elements shown in FIG. 13; i.e., the meta-model of UML 2.0, and the service level abstractions offered by the SOMA method and the created user experience model. If access to the meta-models of these elements is available, then the meta-model of the PIM is relatively well understood.

As noted earlier, one of the challenges in realizing the model driven transformations is knowing the meta-model of the target platform. In cases where the target platforms are proprietary, extracting the meta-model of the target platform can be an engineering challenge. Best practice suggests that an exemplar be created and then the meta-model is reverse engineered from the exemplar. We created the meta models of SAP NetWeaver's WebDynPro and Guided Procedures modules from exemplars.

Figure 17A:
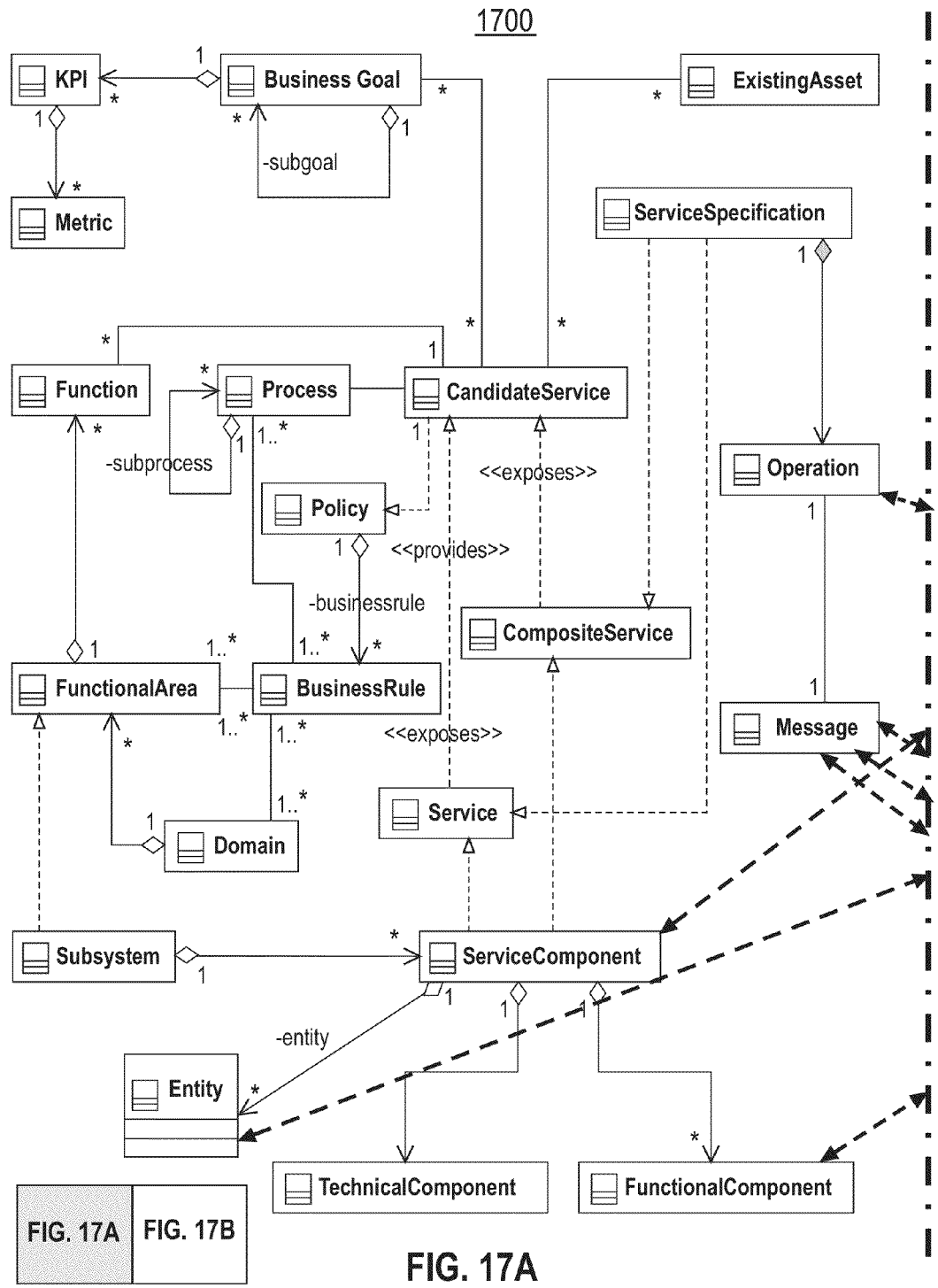
FIGS. 17 and 18 illustrate the transformation rules between the meta-models of the PIM and the SAP NetWeaver composite application framework PSM.
Figure 17B:
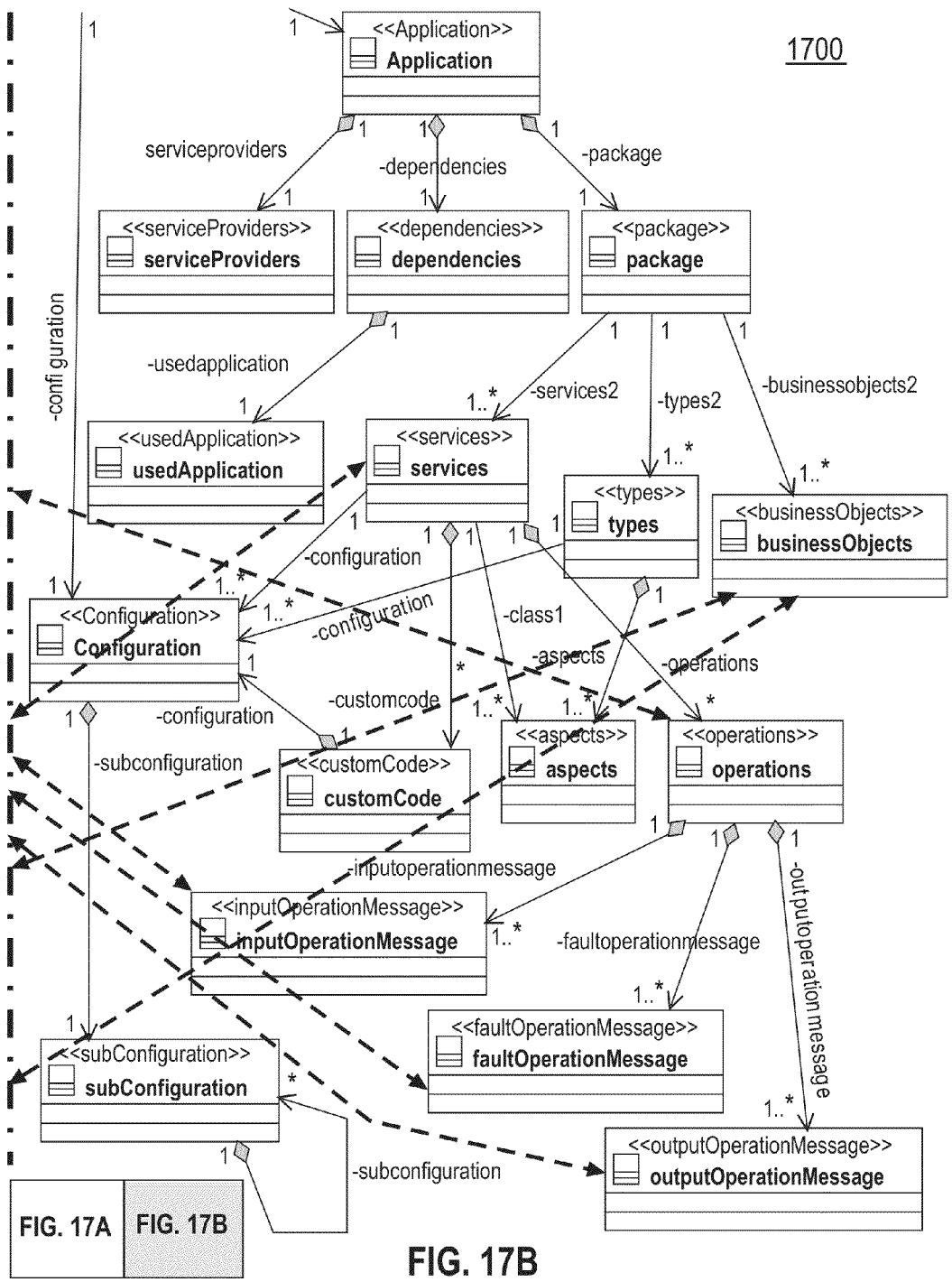
Figure 18A:
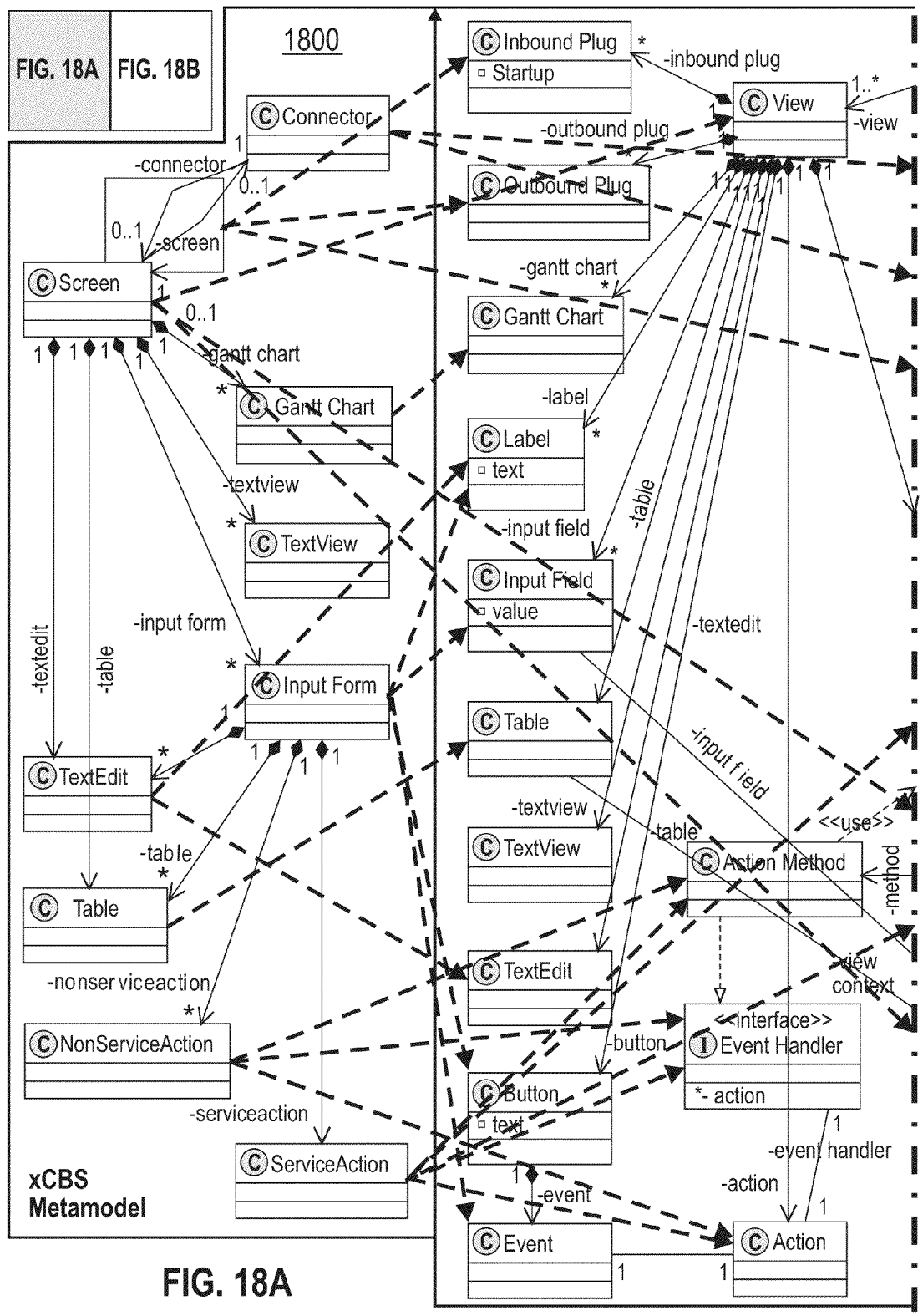
Figure 18B:
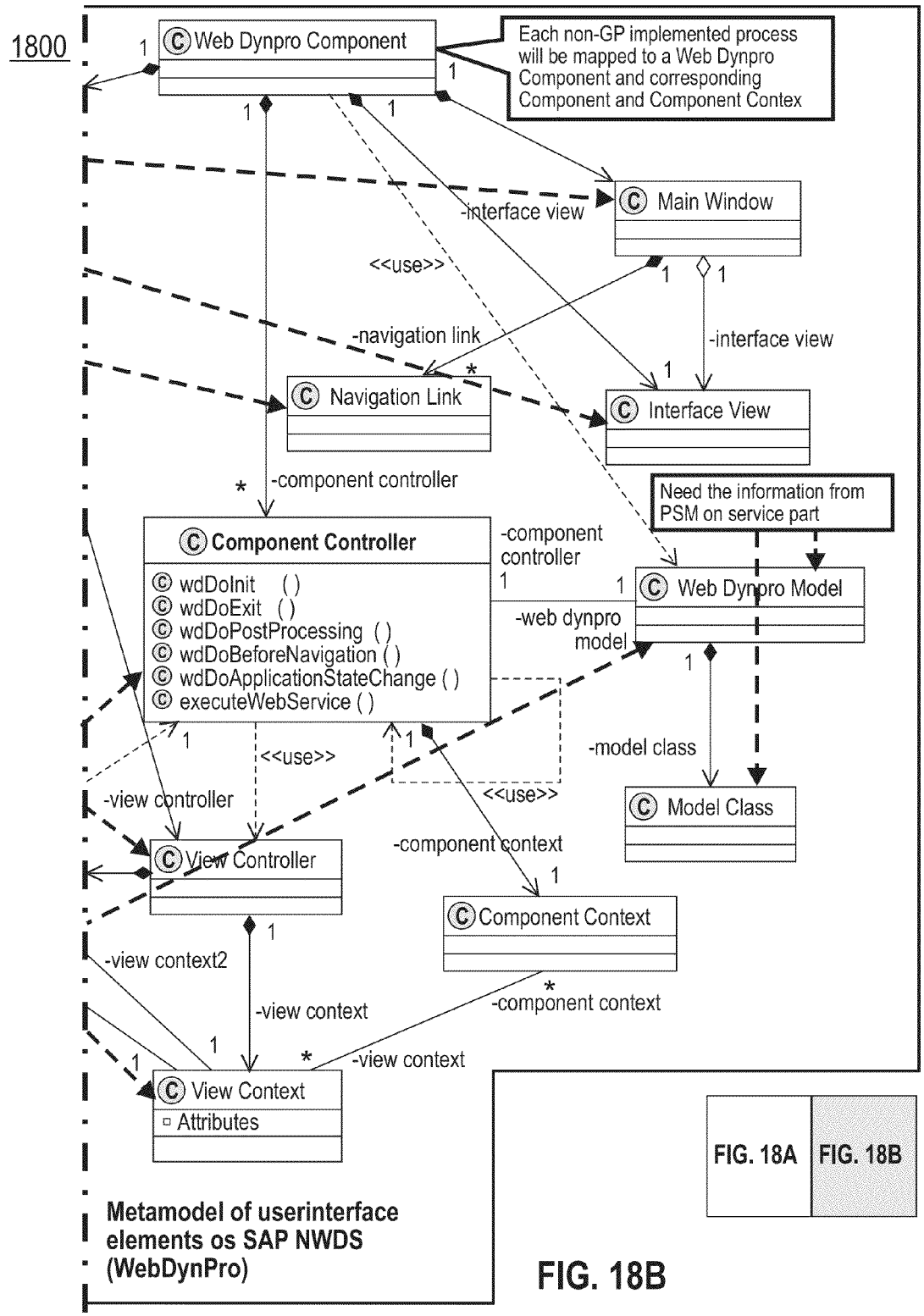
Figure 19:
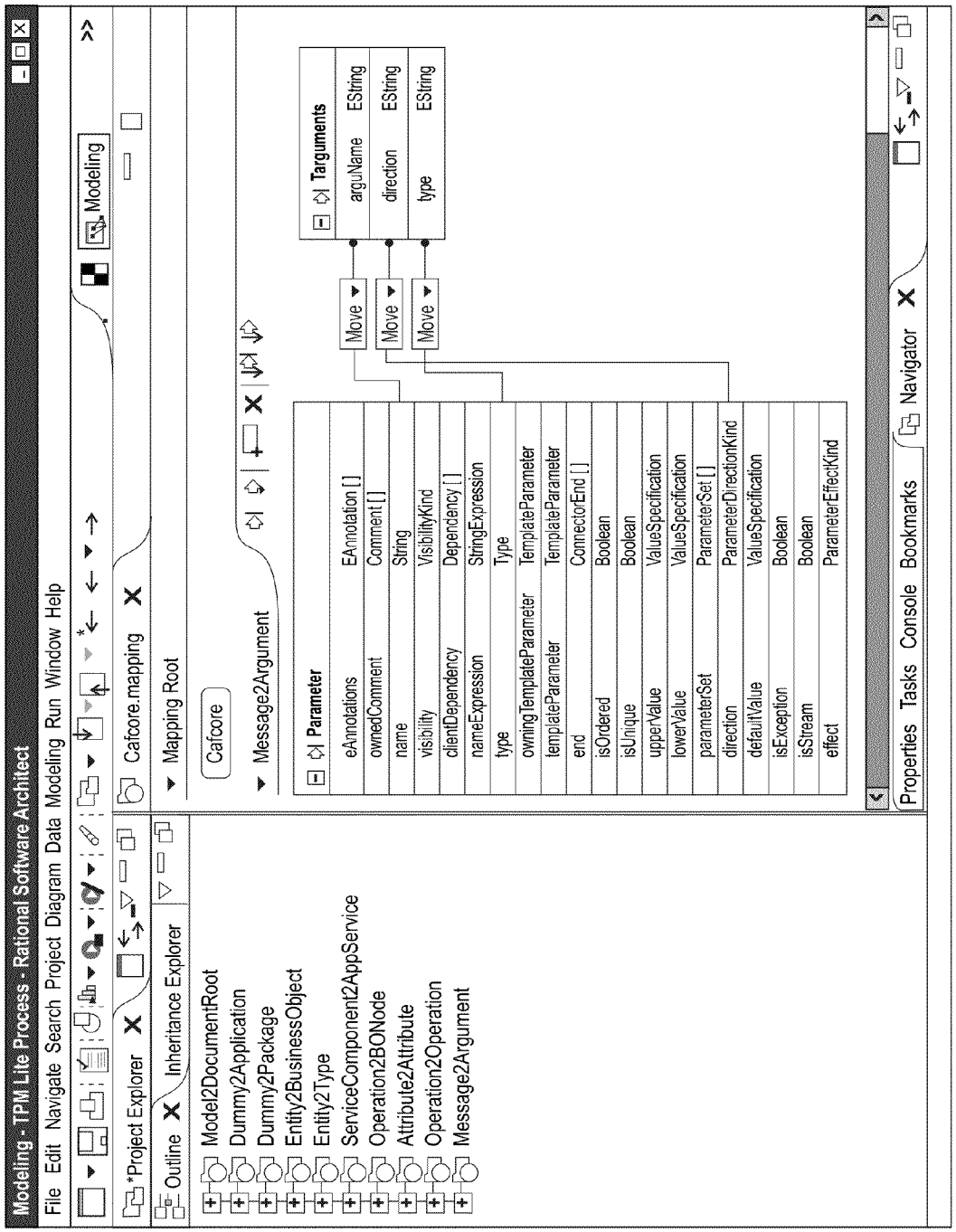
FIG. 19 illustrates how the transformation mapping rules may be developed, for example, using the IBM RSA transformation authoring tool.

FIGS. 17 and 18 illustrate the transformation rules between the meta-models of the PIM and the SAP NetWeaver composite application framework (CAF). Specifically, FIG. 17 shows the transformation mappings 1700 between the service elements of the meta-models of the PIM and the SAP CAF PSM. FIG. 18 shows the transformation mappings 1800 between the user experienced meta-model and the SAP NetWeaver WebDynPro module. FIG. 19 shows how these transformation mapping rules may be developed, for example, using the IBM RSA transformation authoring tool. The transformation rules may be developed manually through observation and domain analysis. Automated ways of deriving transformation rules are being researched.

Figure 20:
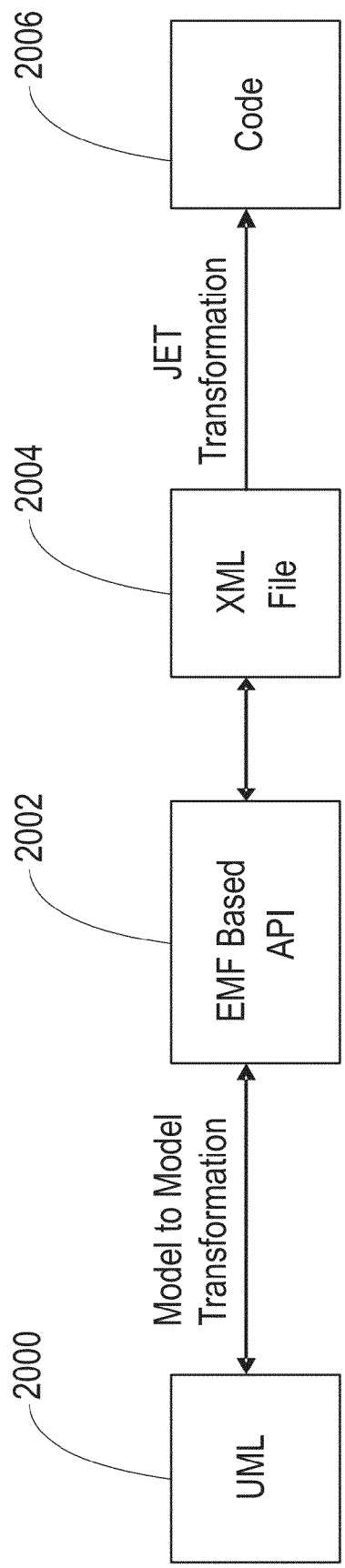
FIG. 20 illustrates an operational version of the method of FIG. 12.

Generating implementation artifacts from platform specific models can save time and effort in application development. As mentioned above, implementation artifacts can be code, database schema, user interface pages, etc. Different vendors offer different tools for code generation depending on the type of code artifacts to be generated and the programming language in which the code is to be generated. In the exemplary embodiment of the present invention, Java code and database schema elements may be generated for both IBM WebSphere and SAP NetWeaver platforms. For this the Eclipse Modeling Framework (EMF)'s Java Emitter Templates (JET) may be used. The transformations to generate code and other artifacts become complex rather quickly. The EMF project offers template based solution to manage complexity during code generation, while JET uses Java Server Pages (JSP) like syntax and enables one to write templates that express the code that one wants to generate. JET is a generic template engine that can be used to generate SQL, XML, Java source code and other output from templates. FIG. 20 illustrates an operational version of FIG. 12 and provides specific technology choices used in the exemplary embodiment of the present invention. The PIM 2000 is expressed in UML, as described above. The PSM 2002 comprises an EMF-based API, that is converted to an XML file 2004 and then the artifacts 2006 (e.g., the code) are generated. As mentioned earlier, the model-to-model and model-to-code generation transformations are typically chained so that the two-step process is transparent to the user. Once the transformations have been written and tested, the next step is to run the transformations.

The transformations created using mapping rules (FIGS. 17-18) and codified using a tool such as the one illustrated in FIG. 19 can then be run by creating a specific instance of the transformation and by supplying it with a specific instance of the source model, for example, the trade promotions management PIM in the exemplary embodiment of the present invention. The output of this transformation is implementation artifacts on the target platform. A platform specific model is an intermediary output of this chained two-step transformation.

The disclosure to this point has focused on how models can be transformed into implementation artifacts via transformations. In a real client environment, unless the business processes are being developed for the first time as a "greenfield" activity on a clean slate, there is typically some legacy code that needs to be reused or integrated while developing changed or updated business processes. Therefore, the implementation artifacts that are generated have to leverage these existing implementation assets. MDA and MDD techniques generally do not specifically discuss leveraging existing assets during transformation authoring.

Figure 21:
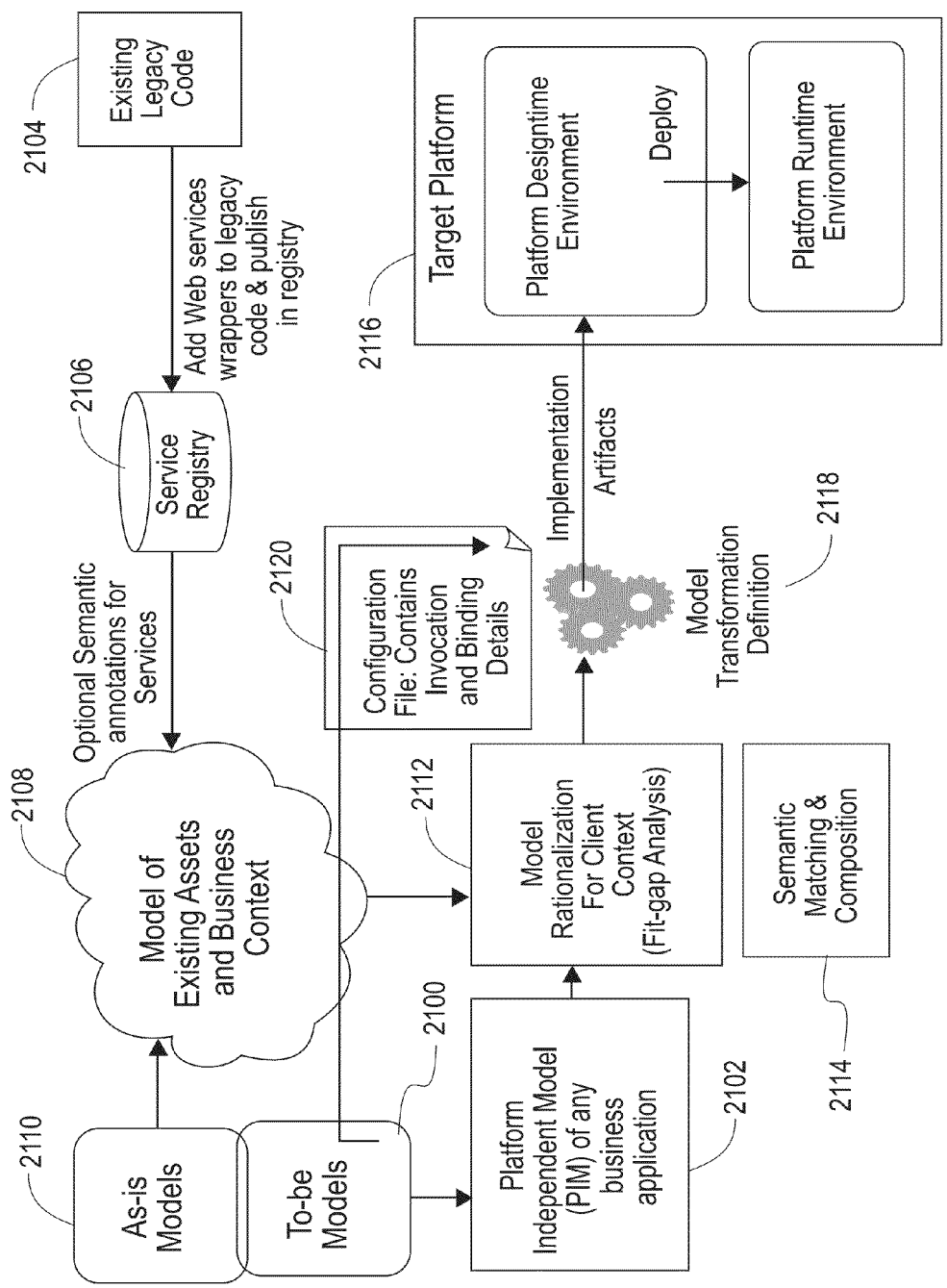
FIG. 21 illustrates a model-driven development approach for existing client assets, in accordance with an embodiment.

FIG. 21 illustrates an approach for leveraging these existing client assets, in accordance with an exemplary embodiment of the present invention. The platform independent models discussed so far can also be referred to as "to-be" models 2100. They indicate the "to-be" state for a given set of business process. If PIM models have been created in a non-UML form using various vendor tools, it may be possible to perform a PIM to PIM transformation to obtain the PIM model 2102 in a desirable form. By using SOA-enablement principles, existing legacy code 2104 can be wrapped as Web services and made available for discovery and integration via the services registry 2106. These services in the registry combined with any other documented or derived process models forms a model 2108 of existing assets. If "as-is" models 2110 exist (which describe the as-is state of the client environment) are not in the desired format, then PSM to PSM transformations can be applied to convert the models to the desired model format 2108. Once the to-be models 2100 and the as-is models 2110 (i.e., existing models) are obtained, the models are rationalized 2112 to note which of the existing services can be leveraged for implementing the defined service interfaces in the to-be models. Model rationalization involves matching existing assets/services in a client setting with modeled and exposed services in the PIM and then generating the details for how to bind to these existing assets/services while generating the composite application artifacts. Semantic Web service discovery matching, mapping and composition techniques 2114 are applied to discover suitable service implementations for modeled services. If the client environment has existing services that can be leveraged, then the specific interface mappings between the services interfaces in the to-be PIM models and the legacy services (from the as-is models) in the service registry are generated by a semantic matching engine. These mappings are passed as inputs into the transformation along with the remaining PIM to PSM transformation mapping rules already specified. Using this approach, when transformations generate implementation artifacts, they are already bound to the existing services in the target platform 2116. The model transformation definition 2118 reads the matching and mapping details from the configuration file 2120 generated by fit-gap analysis and generates the code artifacts with appropriate bindings.

The semantic discovery, matching, mapping and composition technology resolves semantic ambiguities in the descriptions of Web service interfaces by combining information retrieval and semantic Web techniques. Information retrieval techniques are used to resolve the domain-independent relationships. For example, in this approach semantic similarity is derived using an English thesaurus after "tokenization" and part-of-speech tagging of the names of the elements that describe the interfaces of Web services. Semantic Web techniques are used to resolve domain-specific similarities. For example, the concepts used in a given domain (such as retail industry, health-care industry, etc.) and the relationships among them are modeled as domain ontology. The Web services can be optionally annotated using semantic annotations from the domain ontologies in Semantic Annotations for WSDL (SAWSDL) format. Then the ontological similarity of the semantic annotations associated with Web service descriptions is derived by inferring the domain ontology. Matches from the two approaches are combined to determine an overall similarity score to help assess the quality of a Web service match to a given request. In cases where single services do not match a given request, the system can compose multiple services by employing artificial intelligence (AI) planning algorithms in order to fulfill a given request.

The semantic Web service matching framework for (semi)-automatically discovers existing assets from repositories and leverages them during the generation of implementation artifacts. This is done by creating automatic bindings to service implementations from modeled service interfaces. This work can be extended to include rationalization of not just services but processes as well. This involves comparing and matching not just services but all types of models such as behavioral, interaction and structural models of UML.

Figure 22A:
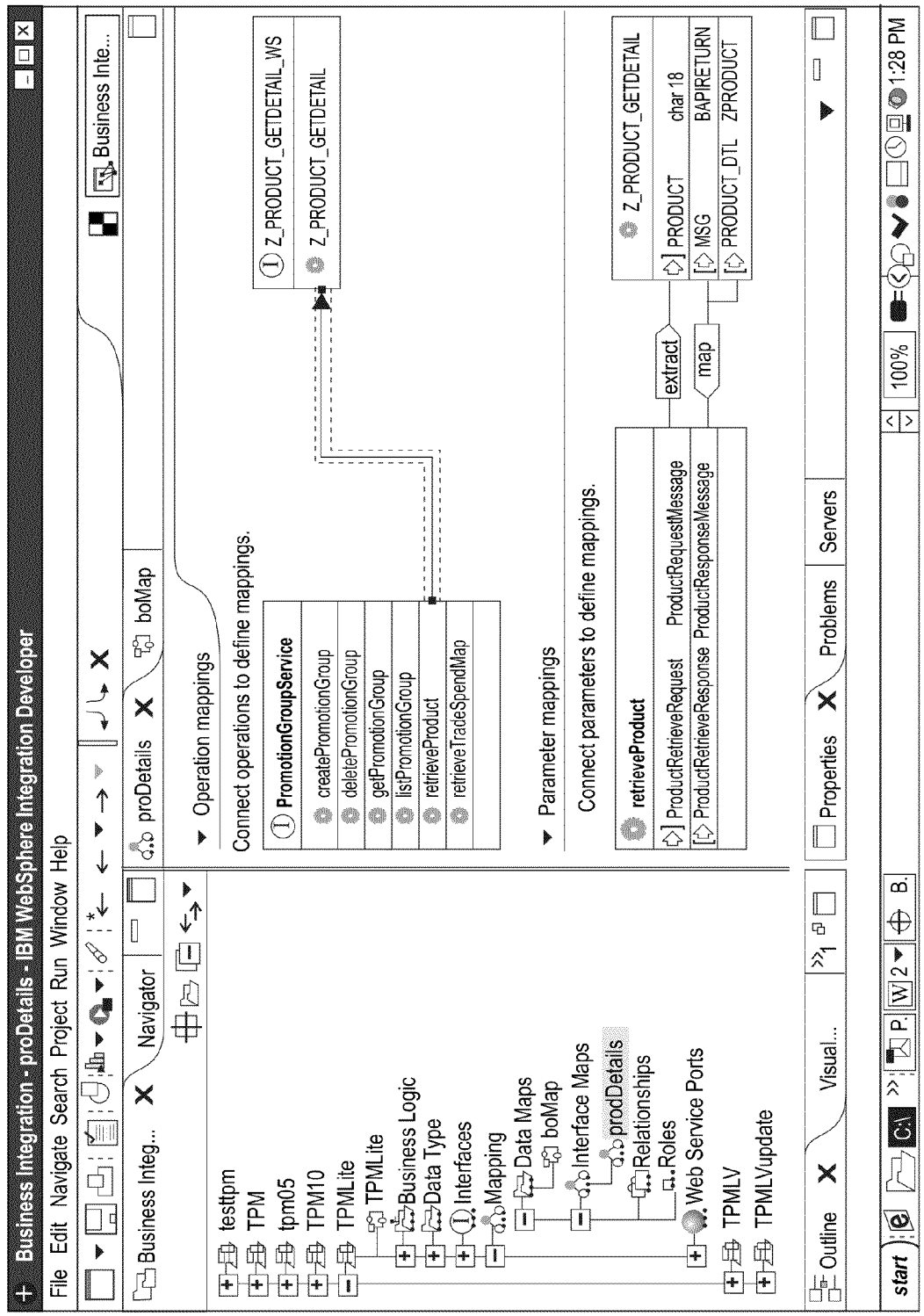
FIG. 22 illustrates the Web service interface mappings between one of the modeled services in the PIM and one of the existing legacy services of a client environment in the trade promotions management scenario of the exemplary embodiment of the present invention.
Figure 22B:
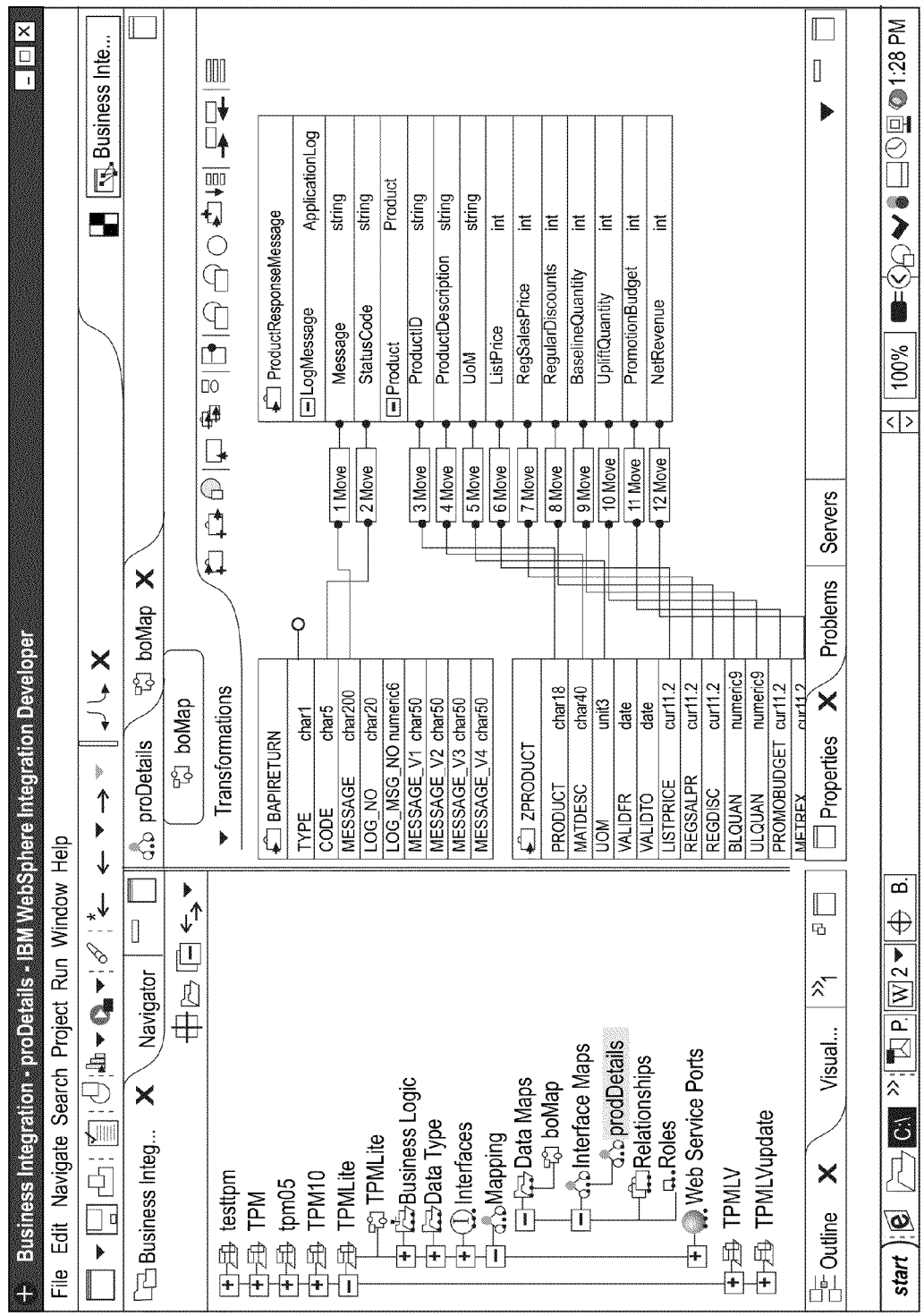

FIGS. 22A and 22B illustrate the Web service interface mappings between one of the modeled services in the PIM and one of the existing legacy services of a client environment in the trade promotions management scenario using the system and method of the present invention.

Figure 23:
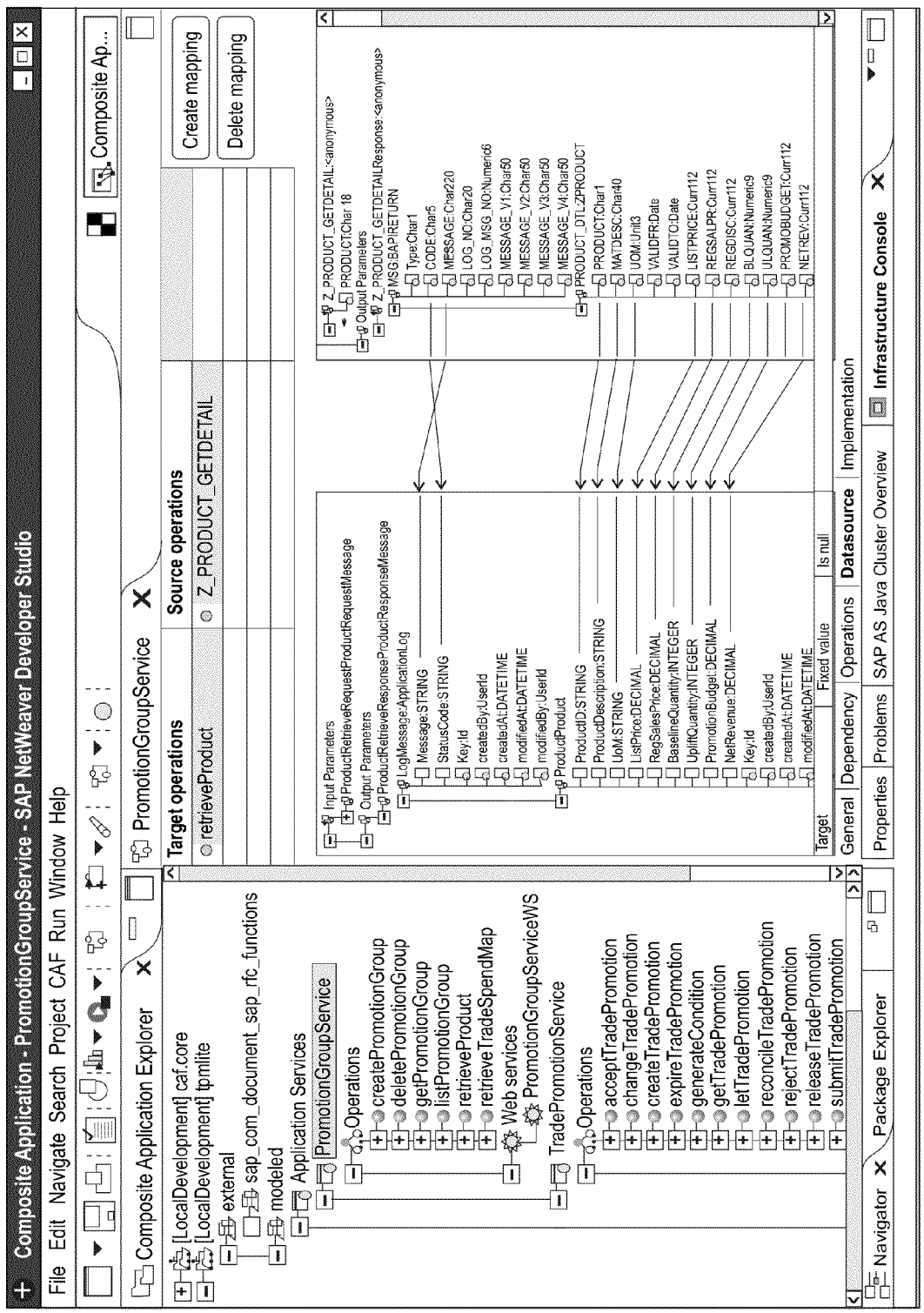
FIG. 23 illustrates artifacts generated on the SAP NetWeaver platform.
Figure 24:
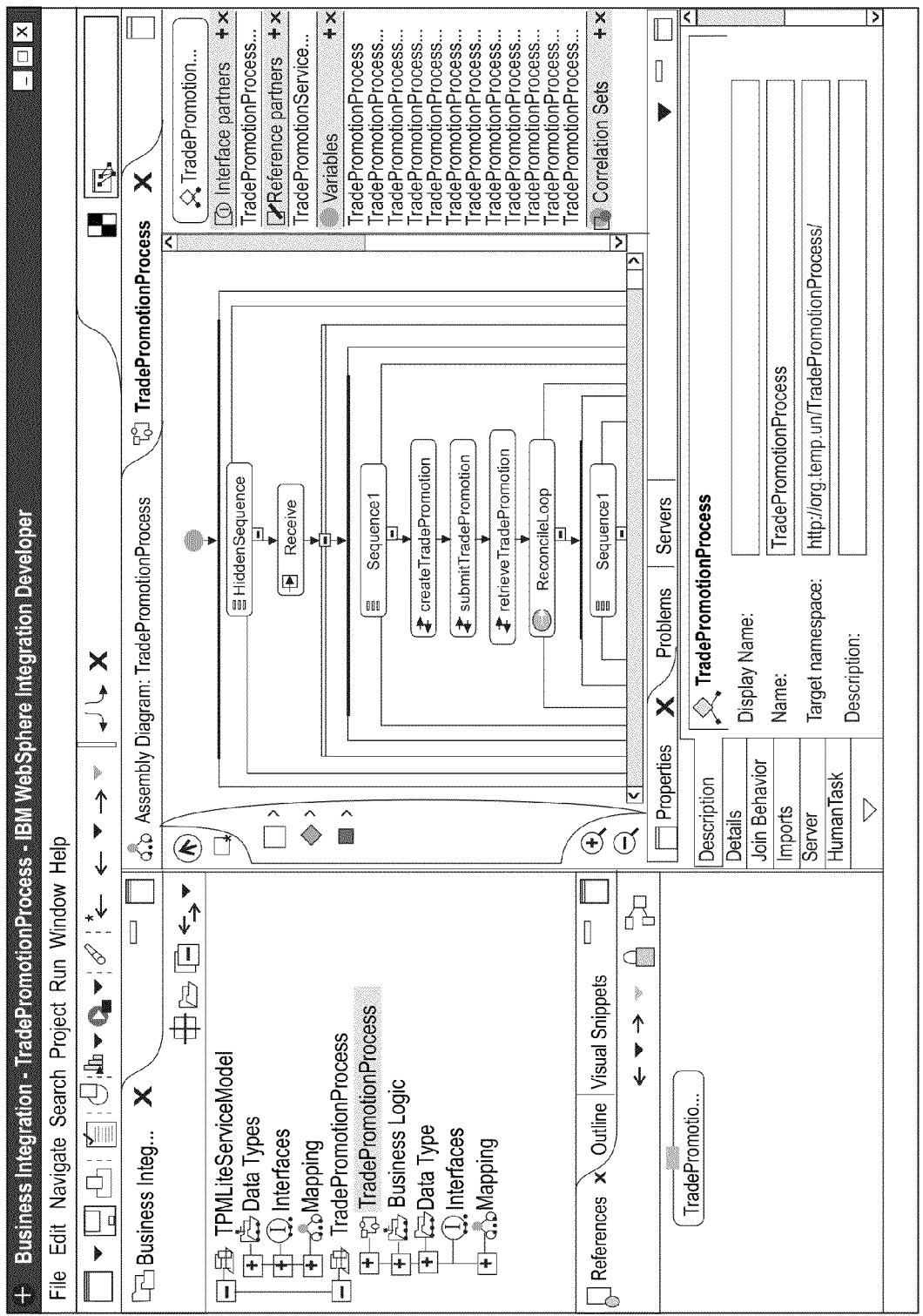
FIG. 24 illustrates artifacts generated on the IBM WebSphere Integration Developer (WID) platform.

FIG. 23 shows the generated artifacts in SAP NetWeaver platform as a result of running the transformations. It includes the exposed services, their messages, interfaces and the corresponding business objects. FIG. 24 shows the generated artifacts on IBM WebSphere Integration Developer (WID) platform.

Figure 25:
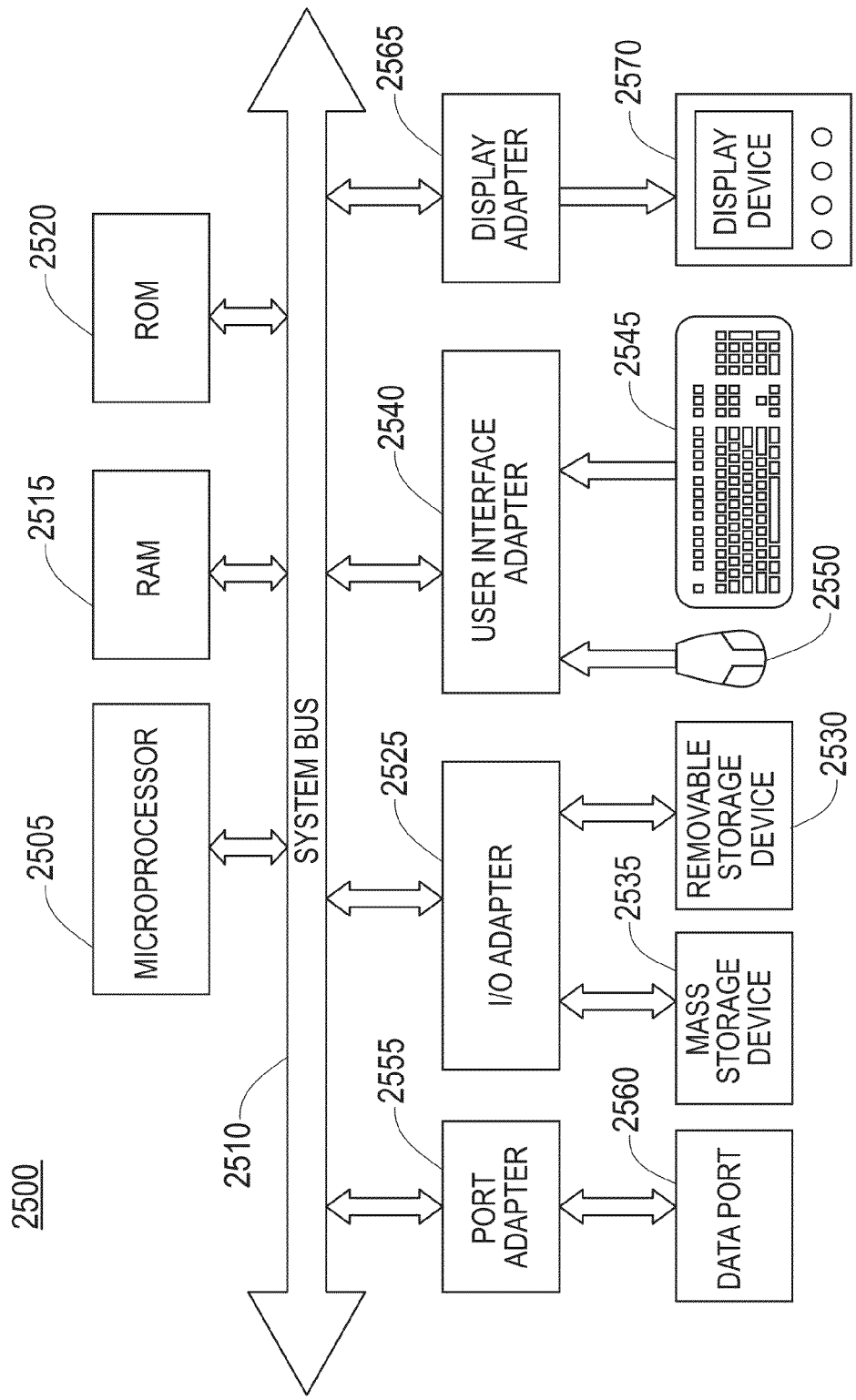
FIG. 25 is a schematic block diagram of a general-purpose computer suitable for practicing embodiments of the present invention.

Generally, the method embodiments described herein may be practiced with a general-purpose computer and the method may be coded as a set of instructions on removable or hard media for use by the general-purpose computer. FIG. 25 is a schematic block diagram of a general-purpose computer suitable for practicing embodiments of the present invention. In FIG. 25, computer system 2500 has at least one microprocessor or central processing unit (CPU) 2505. CPU 2505 is interconnected via a system bus 2510 to a random access memory (RAM) 2515, a read-only memory (ROM) 2520, an input/output (I/O) adapter 2525 for a connecting a removable data and/or program storage device 2530 and a mass data and/or program storage device 2535, a user interface adapter 2540 for connecting a keyboard 2545 and a mouse 2550, a port adapter 2555 for connecting a data port 2560 and a display adapter 2565 for connecting a display device 2570.

ROM 2520 contains the basic operating system for computer system 2500. The operating system may alternatively reside in RAM 2515 or elsewhere as is known in the art. Examples of removable data and/or program storage device 2530 include magnetic media such as floppy drives and tape drives and optical media such as CD ROM drives. Examples of mass data and/or program storage device 2535 include hard disk drives and non-volatile memory such as flash memory. In addition to keyboard 2545 and mouse 2550, other user input devices such as trackballs, writing tablets, pressure pads, microphones, light pens and position-sensing screen displays may be connected to user interface 2540. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 2530, fed through data port 2560 or typed in using keyboard 2545.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described and illustrated above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for cross-platform porting of applications, comprising:
   extracting a platform independent model (PIM) from an existing composite application running on a given source platform; and
   transforming the PIM into generated implementation artifacts on another, target platform, wherein the generated implementation artifacts on the target platform leverage existing assets on the target platform thereby making the generated artifacts contextually-aware
   binding the generated implementation artifacts with an existing service on the target platform by applying a semantic matching algorithm to automatically bind the generated implementation artifacts with the existing service on the target platform;
   wherein extracting a PIM from an existing composite application further comprises:
      identifying existing implementation artifacts of the composite application;
      transforming the identified implementation artifacts for generating a platform specific model (PSM), wherein generating a PSM includes one or more transformations between the implementation artifacts and one or more meta-models of the PSM; and
      transforming the PSM for generating a PIM, wherein generating a PIM includes one or more transformations between the one or more meta-models of the PSM and one or more meta-models of the PIM;
      wherein one or more transformations between elements of the one or more meta-models of the PSM and elements of the one or more meta-models of the PIM include one or more mappings that define rules for mapping between the elements of the one or more meta-models of the PSM and the elements of the one or more meta-models of the PIM, and
      wherein when at least one of the one or more meta-models of the PIM or at least one of the one or more meta-models of the generated PSM are unknown, further comprising automatically creating for each of the unknown meta-models an exemplar that corresponds to the unknown meta-model, and reverse-engineering a known meta-model from the exemplar that corresponds to the unknown meta-model.

2. The method of claim 1, wherein the implementation artifacts comprise code, data base schema, user experience modules, and/or workflow engines.

3. The method of claim 1, wherein at least a portion of the existing implementation artifacts are wrapped as one or more of the services along with associated metadata to thereby facilitate reuse of the at least a portion of the existing implementation artifacts.

4. The method of claim 1, wherein the generated PIM includes a service model, service dependency model, structural model, behavioral model, and/or a user experience model of the composite application.

5. The method of claim 3, wherein the services have formal linkages with business objectives thereby providing traceability between derived services and business objectives served by the services.

6. The method of claim 1, wherein the PIM is created in one of a plurality of formal modeling languages of a group that comprises the Unified Modeling Language (UML), the Resource Description Framework (RDF), or the Extensible Markup Language (XML).

7. The method of claim 1, wherein the elements of the meta-models include service elements from the group that comprises service operations, service messages, service interfaces, business objects and data structures.

8. The method of claim 1, wherein the elements of the meta-models include user experience elements from the group that comprises screens, input forms, text fields, tables, graphs, tabbed views, service actions, non-service actions.

9. The method of claim 1, wherein the mappings between the PIM and the PSM are derived via ontology mapping techniques.

10. The method of claim 1, wherein the generated PSM is rationalized and filtered to extract certain elements of the generated PSM that have value to the generated PIM.

11. The method of claim 10, further comprising extracting service models from the generated PSM.

12. The method of claim 11, further comprising applying a litmus test to the extracted service models to categorize services within the service models as process services, information services, security services or infrastructure services.

13. The method of claim 1, wherein a dependency between various functional modules is derived from the implementation artifacts and is captured as service dependencies and behavioral model in the PSM which is then further transformed into the PIM.

14. The method of claim 13, wherein a dependency between the various functional modules is derived automatically or semi-automatically using call-graph hierarchy generation techniques.

15. The method of claim 1, wherein transforming the PIM into generated implementation artifacts on another, target platform further comprises:
   utilizing the extracted PIM;
   generating a PSM from the PIM, wherein the generating of a PSM includes one or more transformations between one or more meta-models of the PIM and one or more meta-models of the generated PSM;
   generating implementation artifacts; and
   binding the generated implementation artifacts with any existing services of the business application, wherein binding the generated implementation artifacts with the existing service includes applying a semantic matching algorithm to automatically bind the generated implementation artifacts with the existing service of the business application;
   wherein the one or more transformations between service elements of one or more meta-models of the PIM and service elements of one or more meta-models of the generated PSM include one or more mappings that define rules for mapping between the service elements of elements of one or more meta-models of the PIM and the service elements of one or more meta-models of the generated PSM, and
   wherein when at least one of the one or more meta-models of the PIM or at least one of the one or more meta-models of the generated PSM are unknown, further comprising automatically creating for each of the unknown meta-models an exemplar that corresponds to the unknown meta-model, and reverse-engineering a known meta-model from the exemplar that corresponds to the unknown meta-model.

16. The method of claim 15, wherein utilizing the extracted PIM comprises creating a PIM of a business application.

17. The method of claim 15, wherein the PIM is one of the group comprising a process model, a user experience model, and application services that are chosen to be exposed to external parties.

18. The method of claim 15, wherein generating implementation artifacts includes rationalizing the PIM and the PSM, wherein rationalizing includes matching any existing services of the business application with modeled and exposed services in the PIM.

19. The method of claim 15, wherein binding the generated implementation artifacts with any existing services includes applying semantic Web service matching technology to automatically bind the generated implementation artifacts with any existing services of the business application.

* * * * *